US007467113B2

(12) United States Patent
McFarlin et al.

(10) Patent No.: US 7,467,113 B2
(45) Date of Patent: Dec. 16, 2008

(54) LICENSE VERIFICATION SYSTEM AND METHOD

(75) Inventors: Audrey H. McFarlin, Flossmoor, IL (US); Ramakrishna Katuri, Hoffman Estates, IL (US)

(73) Assignee: Walgreen Co., Deerfield, IL (US)

( * ) Notice: Subject to any disclaimer, the term of this patent is extended or adjusted under 35 U.S.C. 154(b) by 0 days.

(21) Appl. No.: 11/388,738

(22) Filed: Mar. 24, 2006

(65) Prior Publication Data

US 2007/0226149 A1 Sep. 27, 2007

(51) Int. Cl.
*G06F 17/60* (2006.01)

(52) U.S. Cl. .......................................... 705/59; 705/75

(58) Field of Classification Search .................. 705/59, 705/75

See application file for complete search history.

(56) References Cited

U.S. PATENT DOCUMENTS

| | | | | |
|---|---|---|---|---|
| 6,035,276 | A | 3/2000 | Newman et al. | |
| 6,073,841 | A * | 6/2000 | Walton | 235/382 |
| 6,571,214 | B2 | 5/2003 | Newman et al. | |
| 6,862,571 | B2 | 3/2005 | Martin et al. | |
| 2001/0032094 | A1* | 10/2001 | Ghosh et al. | 705/1 |
| 2002/0002477 | A1 | 1/2002 | Fox et al. | |
| 2002/0026585 | A1 | 2/2002 | Hondros et al. | |
| 2002/0082876 | A1 | 6/2002 | Martin et al. | |
| 2002/0083014 | A1 | 6/2002 | Brickell et al. | |
| 2002/0087354 | A1 | 7/2002 | Martin et al. | |
| 2002/0120477 | A1 | 8/2002 | Jinnett | |
| 2002/0161605 | A1 | 10/2002 | Newman et al. | |
| 2003/0050811 | A1 | 3/2003 | Freeman, Jr. et al. | |
| 2003/0065626 | A1 | 4/2003 | Allen | |
| 2003/0158807 | A1 | 8/2003 | Takeshi | |
| 2004/0003269 | A1* | 1/2004 | Waxman et al. | 713/193 |
| 2004/0024618 | A1 | 2/2004 | Martin et al. | |
| 2004/0039603 | A1 | 2/2004 | Harahan | |
| 2004/0078211 | A1 | 4/2004 | Schramm-Apple et al. | |
| 2004/0078225 | A1 | 4/2004 | Schramm-Apple et al. | |
| 2004/0117617 | A1 | 6/2004 | Geller et al. | |
| 2004/0148192 | A1 | 7/2004 | Morley et al. | |
| 2004/0186852 | A1 | 9/2004 | Rosen | |
| 2004/0249674 | A1 | 12/2004 | Eisenberg et al. | |
| 2005/0090425 | A1 | 4/2005 | Rearden et al. | |
| 2005/0102394 | A1 | 5/2005 | Loveland | |

FOREIGN PATENT DOCUMENTS

JP 2004038247 A * 2/2004

* cited by examiner

*Primary Examiner*—Pierre E Elisca
(74) *Attorney, Agent, or Firm*—Marshall, Gernstein & Borun LLP

(57) ABSTRACT

A system and method collects regulatory licensing requirements, employment data for a professional and licensing data for the professional, and determines the professional's licensing requirements. Based on the professional's licensing requirements, the system and method determines compliance with the regulatory licensing requirements.

12 Claims, 22 Drawing Sheets

LICENSE VERIFICATION SYSTEM AND METHOD

FIELD OF THE TECHNOLOGY

The present disclosure generally relates to a process for managing and monitoring professional licenses and certifications.

BACKGROUND

Professional licenses, registrations and certifications are traditionally required for many professions, including pharmacy professions. Generally, business entities employ professionals without a reliable manner of verifying and monitoring licenses that may be required by virtue of such employment. In many cases, the responsibility for verifying and monitoring a professional license, if at all, was left to the professional or to a supervisor and was often performed only when the professional was hired. With the employment of several dozen, hundreds or even thousands of professionals and variations among the licensing requirements, the verification and monitoring of the licenses is particularly cumbersome. Further, with business enterprises spanning several jurisdictions, professional licensing requirements often tend to vary among the jurisdictions thereby making the verification and tracking even more onerous. Failure to actively and closely monitor and verify professional licenses and changes in a professional's licensing requirements may lead to oversight regarding license expiration, a lack of a required license, past disciplinary action, etc- potentially creating significant liability for the professional and the employer.

SUMMARY

The method and system enables a professional's licensing requirements to be determined, and enables a corresponding professional license to be verified and monitored.

In one aspect, a method of monitoring licensing information includes collecting regulatory licensing data related to license requirements of a regulatory entity, collecting employment data related to a licensee entity's employment, collecting entity licensing data related to a license associated with the licensee entity, determining entity license requirements based on the regulatory licensing requirements and the employment data, the license requirements related to license requirements of the licensee entity, and determining compliance with the entity license requirements based on the entity licensing data to produce a compliance result.

In another aspect, a system for monitoring a pharmacy license includes one or more user interfaces, one or more data collection routines adapted to be executed by a processor which collect regulatory licensing data related to license requirements of a pharmacy regulatory entity, employment data related to workplace location and workplace position, and pharmacy licensing data related to a pharmacy license, a store routine adapted to be executed by a processor which stores the regulatory licensing data, the employment data and the pharmacy licensing data, a license requirements routine adapted to be executed by a processor which determines pharmacy license requirements for a pharmacy professional based on the regulatory licensing data and the employment data, and a license monitoring routine adapted to be executed by a processor which determines if a valid pharmacy license is associated with the pharmacy professional in accordance with the license requirements of the pharmacy regulatory entity.

In a further aspect, a system for displaying licensing information for a pharmacy employing one or more pharmacy professionals includes a processor, a display, a database adapted to store data relating to a licensing requirements of a pharmacy professional employed by pharmacy and data relating to one or more professional licenses associated with the pharmacy professional, a routine adapted to be executed by the processor which displays licensing data pertaining to the professional license, and a routine adapted to be executed by the processor which displays data relating to compliance with the licensing requirements based on the data relating to one or more professional licenses.

DRAWINGS

Figure 19:
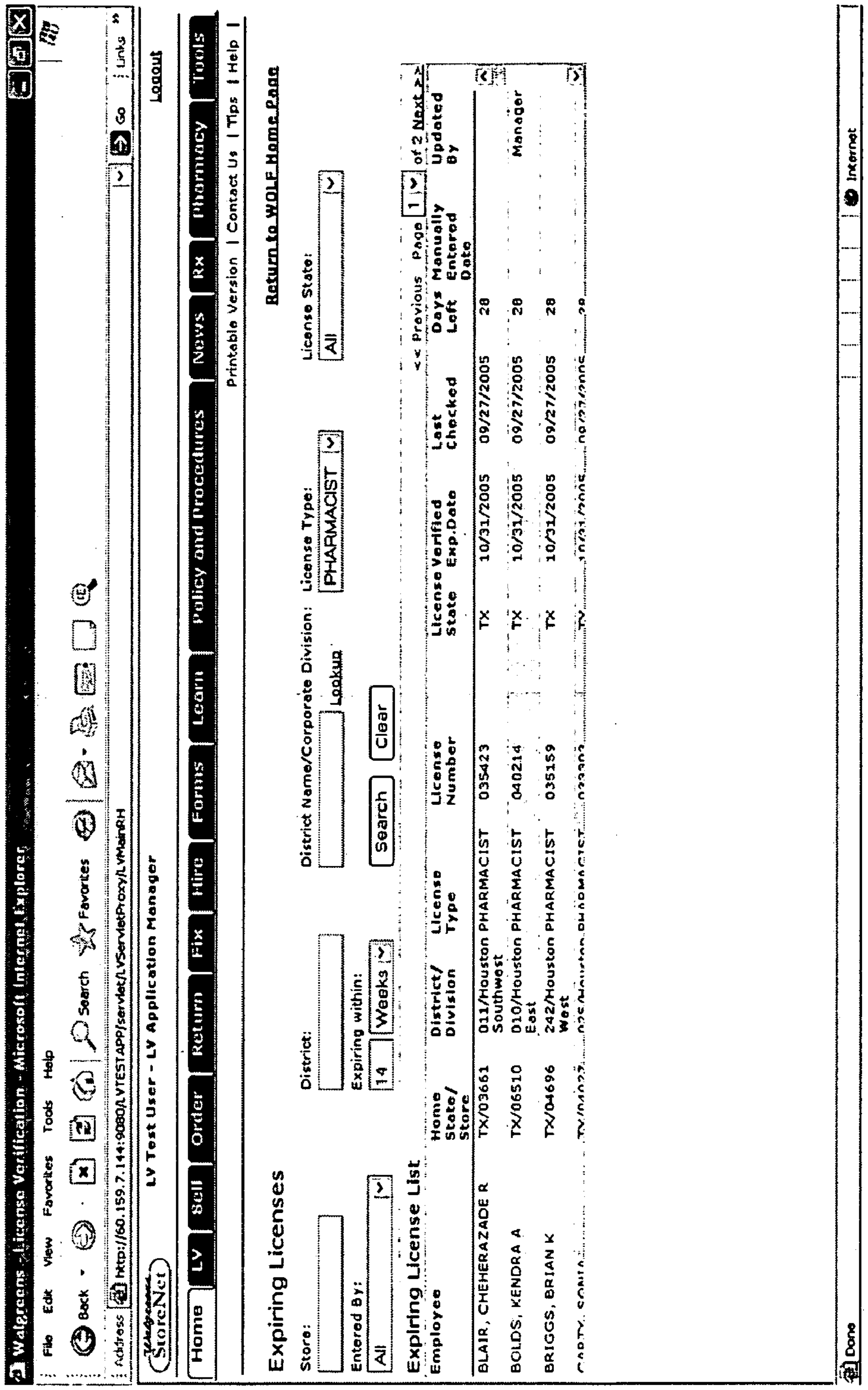
FIG. 19 is an exemplary graphical display that may be provided by a graphical user interface to enable a user to view alerts relating to a license about to expire.
Figure 20:
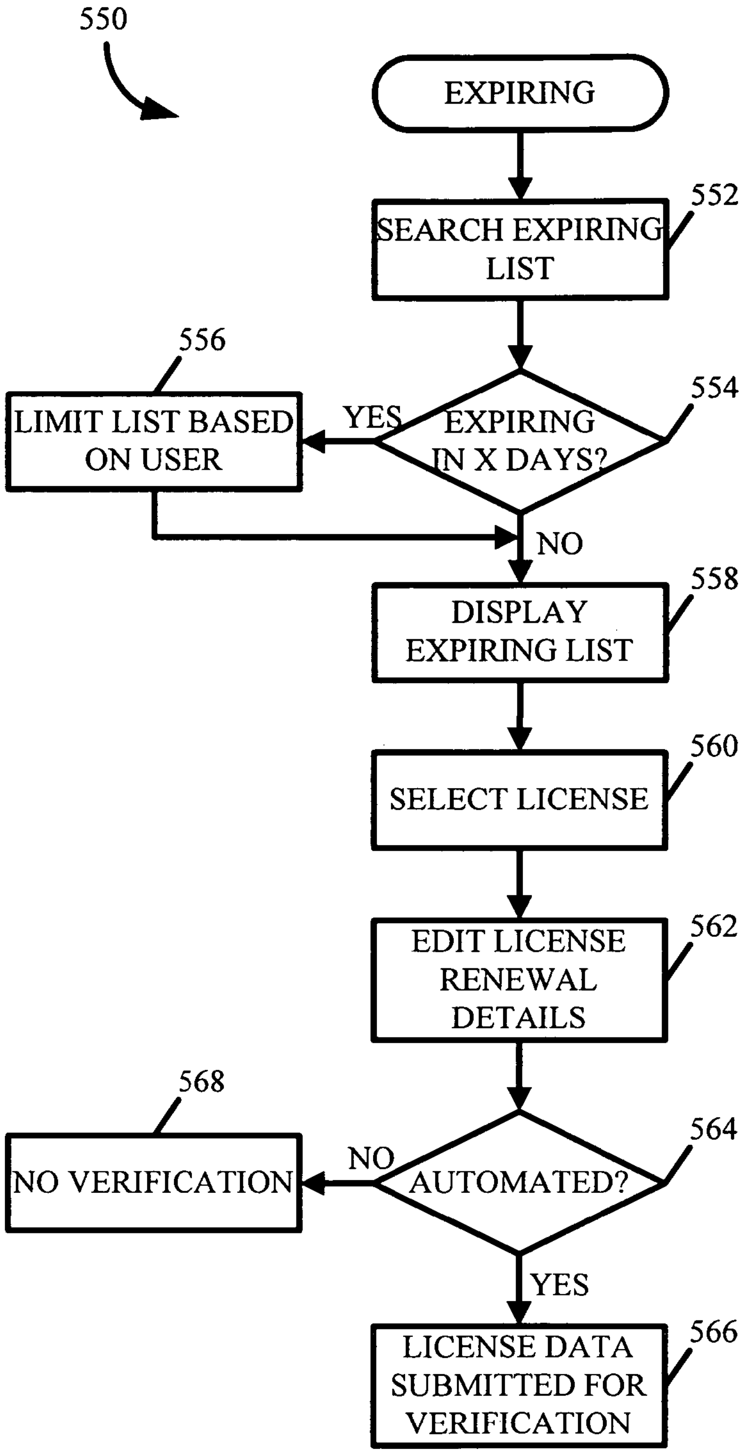
Figure 21:
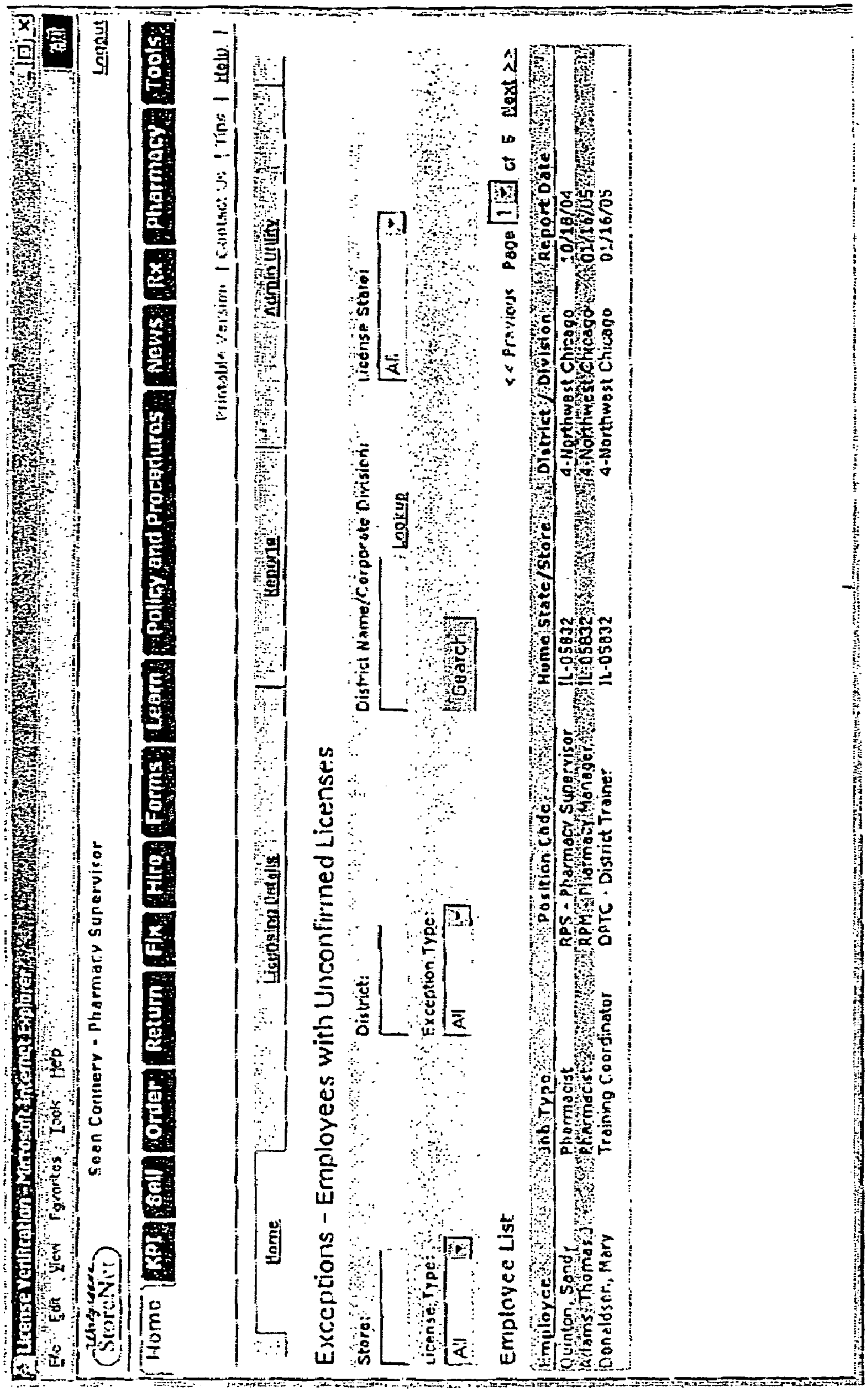
Figure 22:
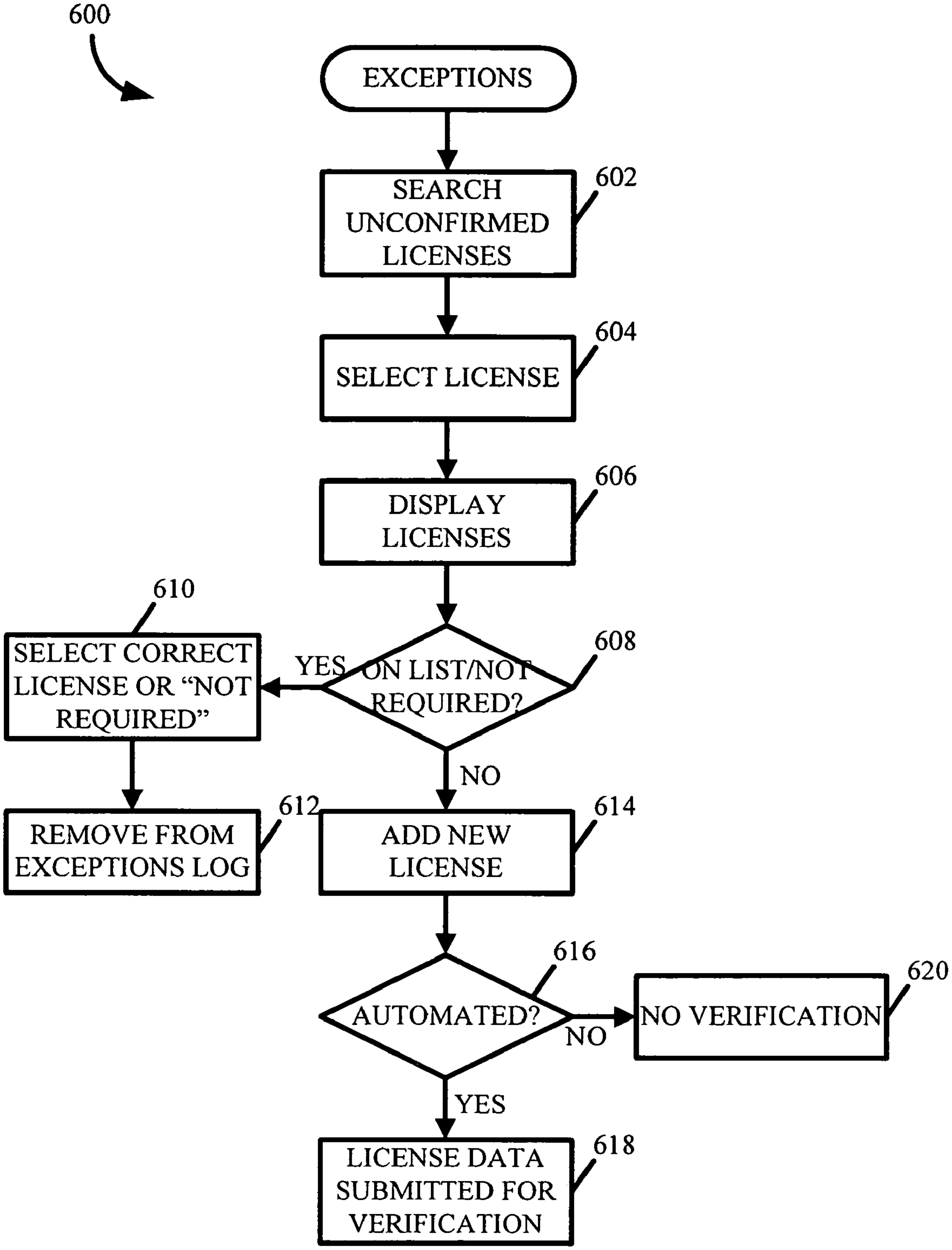

FIG. 20 an example of a process for handling expiring licenses from FIG. 19;

FIG. 21 is an exemplary graphical display that may be provided by a graphical user interface to enable a user to view alerts relating to an exception license; and FIG. 22 is an example of a process for handling an exception license from FIG. 21.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
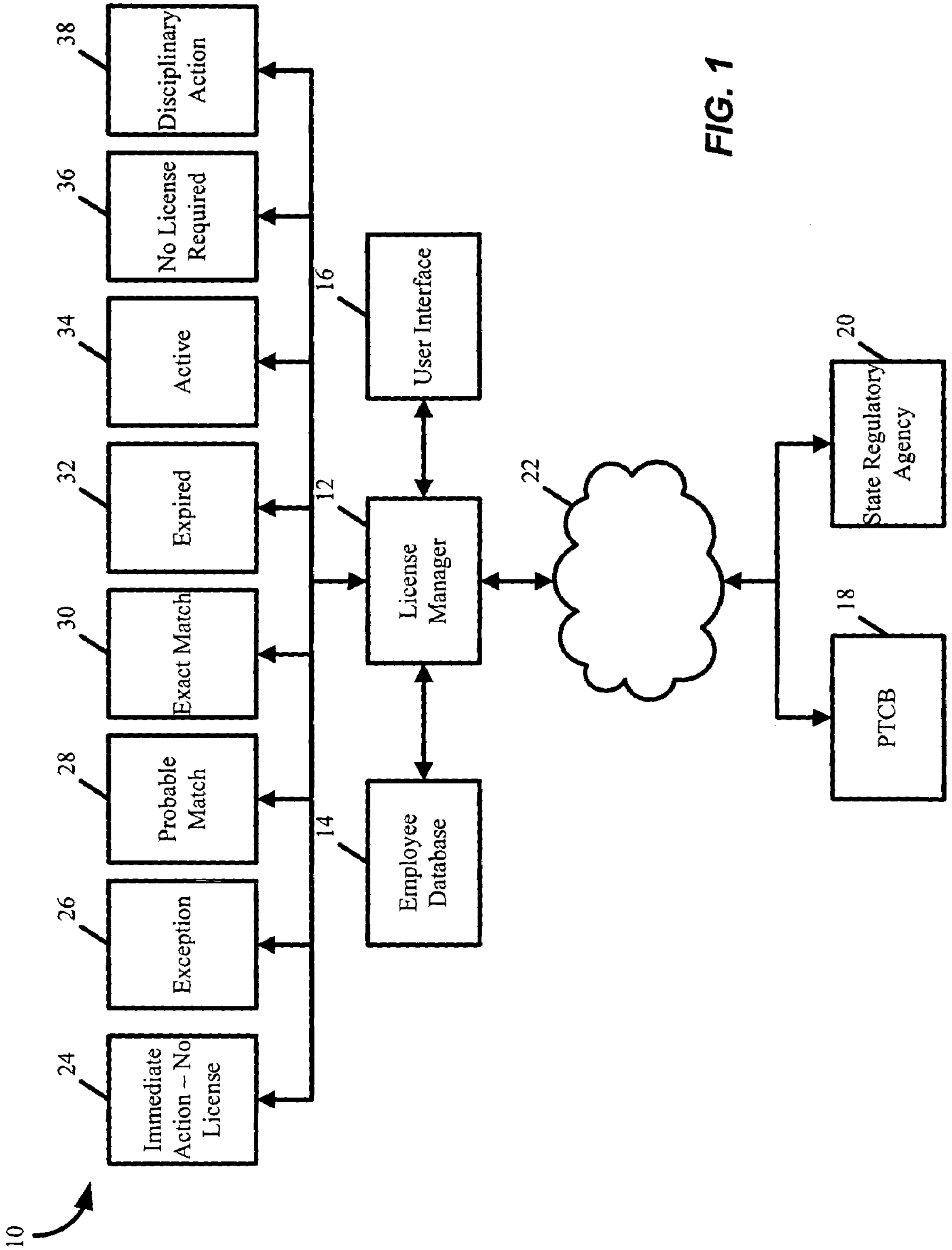
FIG. 1 is a block diagram of an example of a system for verifying professional licenses having a license manager configured to receive data from various sources and determine compliance with license requirements.

FIG. 1 is an exemplary schematic block diagram of an example of a system 10 for verifying and monitoring professional licenses. The system 10 may be used to verify that a licensee entity has a valid professional license per the requirements of a regulatory entity and/or per the requirements of a business entity that employs the licensee entity. The system 10 may further monitor the status of the license, including, but not limited to, monitoring the expiration of a license, disciplinary actions associated with the licensee entity, and the like. The system 10 is applicable to a variety of professional licenses for licensee entities, including, but not limited to, pharmacy licenses for pharmacy interns, pharmacy technicians in training, pharmacy technicians, pharmacists, employees, job applicants, and the like. Although the following description refers in particular to licenses issued by the Pharmacy Technician Certification Board (PTCB) and state regulatory agencies, it should be recognized that the system 10 is applicable to licenses, certifications, registrations and the like, which are issued by a variety of regulatory entities including, but not limited to, various governmental regulatory agencies and private regulatory entities.

By way of example only, the system 10 includes a license manager 12, an employee database 14, and one or more user interfaces 16, all of which may be communicatively coupled via a local area network (LAN). The license manager 12, employee database 14, user interfaces 16 may be-distributed throughout a business enterprise, such as a pharmacy. For example, the license manager 12 and employee database 14 may be provided at a central location, and a user interface 16 may be provided at each pharmacy retail outlet associated with the business entity. The license manager 12 may be provided as a computer system having a processor operatively coupled to a memory, and may manage and maintain data files on numerous licensee entities, licenses associated licensing data.

The system 10 further includes one or more regulatory entities 18, 20, including private regulatory entities 18 such as the PTCB and governmental regulatory entities 20 such as a state regulatory agency, which may be communicatively coupled to the license manager 12 via the Internet 22. While many of the systems, databases, etc. shown within the system 10 are coupled to the license manager 12 via the LAN or an internet 22, it should be recognized that any other suitable communication link may be used instead without departing from the scope and the spirit of the invention. Additionally, it should be recognized that databases, systems and entities other than those specifically illustrated in FIG. 1 may be communicatively coupled to the license manager 12 via the Internet 28 or any other suitable communication link, including, but not limited to, additional government regulatory agencies, additional private regulatory entities, additional entities within a business enterprise, and the like.

The license manager 12 is further coupled to a variety of data logs or tables to maintain, monitor and categorize data relating to various licensee entities and licenses. In particular, the data logs may include an "Immediate Action—No License" log 24 to monitor licensee entities that require a license but for which no known license has been found associated with the licensee entity. An "Exception" log 26 is provided for licenses that are inconclusively associated with a licensee entity, such as a license that is a probable match with a licensee entity. Accordingly, the license manager 12 maintains a "Probable Match" log 28 for licenses that do not exactly match with a licensee entity, and an Exact Match" log 30 for licenses that exactly match with a licensee entity. An "Expired" log 32 is provided for licenses that have expired or are about to expire. An "Active" log 34 is provided for active licenses in good standing and which do not require any action. A "No License Required" log 36 is provided for those licensee entities that do not require a license. A license may not be required if it is not a license requirement of the regulatory entity, is marked as not required via an override or not required until a future date. A "Disciplinary Action" log 38 is provided for disciplinary actions associated with a licensee entity or associated license. The "Disciplinary Action" log may include details related to the disciplinary action, including the reason for disciplinary action, restrictions on the licensee entity, etc. The "Disciplinary Action" log may further maintain licenses that have a status other than active or expired. Each of the logs 24-38 may be maintained in one or more memories including a memory for the license manager 12.

Some or all of the logs 24-38 may be associated with an alert when a licensee entity or license is added to the log. Alerts may be generated for only particular licenses or licensee entities. The recipient of the alert may depend on the alert being generated and the licensee entity associated with the alert. For example, if a pharmacy employee, such as a pharmacist, pharmacy intern or pharmacy technician, is the licensee entity, the alert recipient may include the licensee entity in addition to a pharmacy manager and a pharmacy supervisor. On the other hand, if the store manager is the licensee entity, the alert recipient may include the district manager. As a result, a hierarchical system is provided allowing appropriate oversight of all licensee entities within a business enterprise at varying levels of employment within the enterprise. An alert may be provided as a message to the recipient when logging into the system 10, a text message to a cellular phone or pager, an email, or the like.

As an example, when a licensee entity is added to the "Immediate Action—No License" log 24, an alert may be generated and provided to the licensee entity. Further, a no license alert may be provided to the supervisor of the licensee entity as maintained in the employee database 14, thereby allowing the supervisor to take appropriate corrective action. The licensee entity or supervisor may terminate the alert by providing information related to a valid license for the licensee entity.

For a licensee entity or license listed in the "Expiration" log 32, alerts may be generated at various intervals, such as an alert generated at 60 days prior to expiration of the license, at 30 days prior to expiration, at 15 days and again at 1 day prior to expiration. At 60 days, a 60 day expiration alert may be provided to the licensee entity holding a license, and the 60 day expiration alert may be terminated by the licensee entity canceling the alert or renewing the license. At 30 days, a 30 day expiration alert may be provided to the licensee entity holding a license, in addition to providing the alert to a store manager, district manager and/or supervisor. The 30 day expiration alert may be terminated by the licensee entity canceling the alert or renewing the license, or by the store manager, district manager or supervisor canceling the alert. At 15 days, a 15 day expiration alert may be provided to the licensee entity and to a store manager, district manager and/or supervisor, and canceled by the licensee entity, store manager, district manager and/or supervisor canceling the alert or the licensee entity renewing the license. At 1 day, a 1 day expiration alert may be provided to the licensee entity and to a store manager, district manager and/or supervisor, and canceled by the licensee entity, store manager, district manager and/or supervisor canceling the alert or the licensee entity renewing the license. If a license is expired, an alert may be immediately generated and provided to the licensee entity and to a store manager, supervisor, district manager, etc. and canceled only when renewed.

Likewise, licensee entity or license added to the "Disciplinary Action" log 38 may result in a disciplinary alert being generated and sent to a supervisor of the licensee entity, as provided in the employee database 14. The disciplinary alert may include a summary of the events causing the disciplinary alert including details regarding the disciplinary action. The disciplinary alert may be terminated by the supervisor removing the licensee entity and/or license from the "Disciplinary Action" log 38 or canceling the alert.

The employee database 14 includes employment data on each licensee entity within a business enterprise, including, but not limited to, the licensee entity's workplace location (e.g., state, country, etc.) and workplace occupation (e.g., pharmacist, pharmacy technician, pharmacy intern) which may be maintained via a payroll occupation code. Additional employment data may include data related to identification of the licensee entity, such as the licensee entity's full name, employment identification, social security number, date of birth or other manner of identification.

The user interface 16 may be used to add, view and edit the license information of each licensee entity and any corresponding alerts. Accordingly, the user interface 16 includes a graphical user interface to add, view and edit the license information of a licensee entity. The particulars of the graphical user interface may depend on the user of the user interface 16. For example, a user who is the district manager of a pharmacy business may have viewing and editing rights for license information of all pharmacy managers, store managers, pharmacists, pharmacy technicians and pharmacy interns under the district manager's supervision. However, a pharmacist may only have viewing rights and limited editing rights for only the pharmacist's license information. Accordingly, various viewing and editing rights may be associated with each user, and the user interface 16 provided for each user may vary depending on the associated viewing and editing rights.

The regulatory entities 18, 20 include databases which contain data relating to license requirements pertaining to the particular regulatory entity, such as required licenses, education requirements, training requirements, and the like. Different licenses may be required for different workplace occupations. For example, a state regulatory agency 20 may require a particular license for all persons having an occupation as a pharmacist, a different license for a pharmacy technician, and yet another license for a pharmacy intern, each having its own licensing requirements. The regulatory entities 18, 20 may further maintain data relating to a license associated with each licensee entity under the regulatory entity's jurisdiction, including, but not limited to, license status (e.g., active, inactive), a license identification (e.g., license number), expiration date, license type (e.g., pharmacist license, pharmacy technician license, pharmacy intern license, PTCB certification), an indication of disciplinary actions and details associated with the license, licensee entity name, licensee entity address, licensee entity date of birth, licensee entity social security number, and the like.

Figure 2:
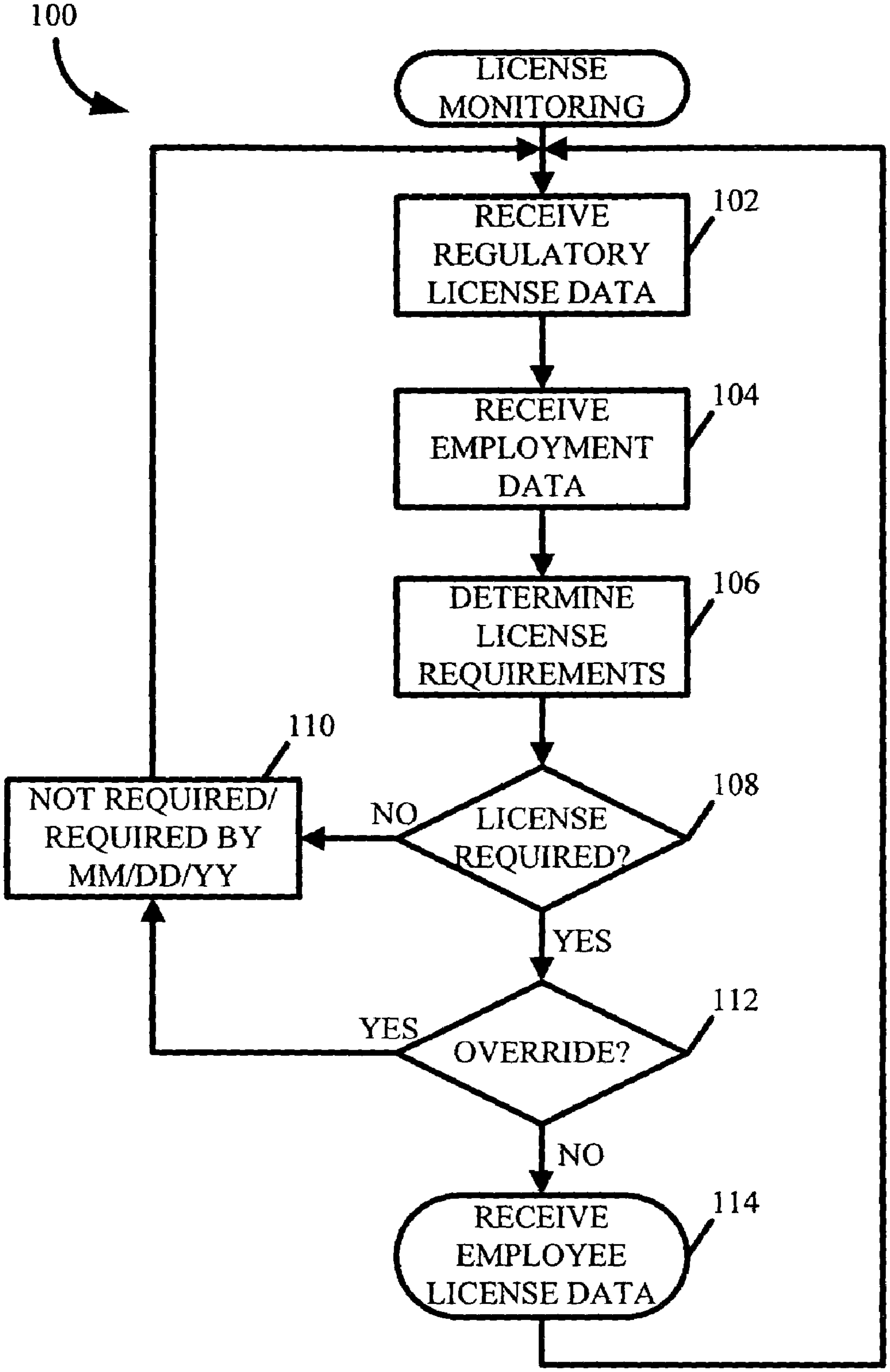
FIG. 2 is a flow chart of an example of a method for monitoring a professional license which may be executed by the license manager of FIG. 1.

FIG. 2 illustrates an example of a license monitoring routine 100 which may be executed by the license manager 12 for monitoring and verifying one or more professional licenses. In particular, the license monitoring routine 100 may be used to track professional licenses for employees or prospective employees within a business enterprise. Although disclosed as monitoring a single licensee entity, it should be recognized that multiple licensee entities may be monitored simultaneously. As such, the license monitoring routine 100 may be executed for batches of licensee entities. Further, the license monitoring routine 100, or aspects thereof, may be executed initially to collect data as described herein, and then executed on a periodic basis to collect updated data and continually monitor and verify licenses of various licensee entities. The frequency of the execution of the license monitoring routine 100 may depend on the license, certification or registration in question. For example, PTCB licensing data may be updated on a monthly basis, whereas state regulatory licensing data may be updated on a nightly basis. Further, the frequency of execution may depend on the purpose. For example, verification of the existence of a license and validation of the license may be performed more frequently then validating the disciplinary status of a license. Validation of the expiration date may also be performed periodically to monitor the renewal or expiration of a license beginning 3-6 months prior to the execution date and then every 15 days thereafter until the expiration date or until the license has been renewed. Changes to the data maintained by license manager 12, the employee database 14, or the regulatory entities 18, 20 may also cause the license monitoring routine 100 to be executed.

Beginning at block 102, the license monitoring routine 100 collects regulatory licensing data relating to the licensing requirements of a regulatory entity, such as the private regulatory entity 18 and/or the governmental regulatory agency 20. The regulatory license data may be provided by manually inputting the data to the license manager 12, or may be provided automatically from the regulatory entities 18, 20 via the internet 22. In one example, the regulatory licensing data may be collected for multiple regulatory entities, including regulatory agencies for all states, for those states where the business entity has a presence, for those states where the licensee entity has a workplace location, etc. Likewise, regulatory licensing data may be collected for multiple private regulatory entities, including private certification boards, trade associations, peer review bodies, etc. Regulatory licensing data may be collected on a periodic or event-driven basis by the license manager 12. Further, license requirements having a future effective date may be monitored and tracked to implement the new license requirement upon the effective date.

Employment data is collected at block 104 from the employee database 14 or collected manually for prospective employees. The collected employment data relates to the licensee entity's employment, including the licensee entity's workplace location and workplace occupation. Additional employment data collected at block 104 may include identification information for the licensee entity, including the licensee entity's name, date of birth, social security number, address, etc. In some cases, licensing data for the licensee entity may be previously provided and stored in the employee database 14. The licensing data may include a license number or other manner of license identification. The licensing data may be provided to the license manager 12 as part of the employment data and used to search for licensing data related to a license associated with the licensee entity as described further below. The employment data may be collected by the license manager 12 on a periodic or event-driven basis.

In order to determine the license requirements for a licensee entity at block 106, the license monitoring routine 100 uses the license requirements collected at block 102 and the employment data at block 104. In particular, the license monitoring routine 100 uses the workplace location to retrieve the regulatory licensing data of the corresponding regulatory agency. For example, a pharmacist having workplace locations of Chicago, Ill. and Gary, Ind. causes the license monitoring routine 100 to retrieve the pharmacist licensing requirements of the Illinois Department of Financial and Professional Regulation, Division of Professional Regulation and the Indiana Professional Licensing Agency. Using the employment data relating to the pharmacist's workplace occupation (i.e., pharmacist), the license routine 100 determines whether Illinois and Indiana require licenses for pharmacists practicing in Illinois and Indiana, respectively, and requirements for maintaining the license (e.g., training, expiration, etc.) based on the regulatory licensing data for Illinois and Indiana. Similar determinations of license requirements may be made for various other profession occupations, including, but not limited to, pharmacy interns, pharmacy technicians, pharmacy technicians-in-training, etc. The determination of the license requirements may be performed whenever the license manager 12 receives regulatory license data and/or employment data, or whenever there is a change in the regulatory license data and/or employment data which may affect the license requirements of a licensee entity.

At block 108, the license monitoring routine 100 may determine whether a license is required for the licensee entity based on the determination at block 106. If a license is not required or is only required by a particular date as determined at block 110, the licensee entity is added to the "No License Required" log 36 and the license monitoring routine 100 returns control to block 102 to monitor the license of another licensee entity. If a license is required, the license monitoring routine 100 may determine whether an override has been provided for the licensee entity at block 112. An override may be provided for a licensee entity's licensing requirements if someone, such as a supervisor, has indicated that the licensee entity does not require a license, or that a license is not currently required but will be required by a future date. If an override exists for the licensee entity at block 112, a license is not required as determined at block 110 and control returns to block 102. Otherwise, the license monitoring routine 100 collects entity licensing data at block 114. The entity licensing data relates to a license associated with the licensee entity and may include identification of the regulatory entity, the license type, the license identification, data regarding the licensee entity (e.g., name, date of birth, social security number, address, place of employment, etc.), and the like. The license manager 12 determines compliance with the entity license requirements based on the entity licensing data, such as determining whether the entity has a valid, active license as required by the regulatory entity. Examples of the collection of entity licensing data and determining compliance are described further below.

Figure 3:
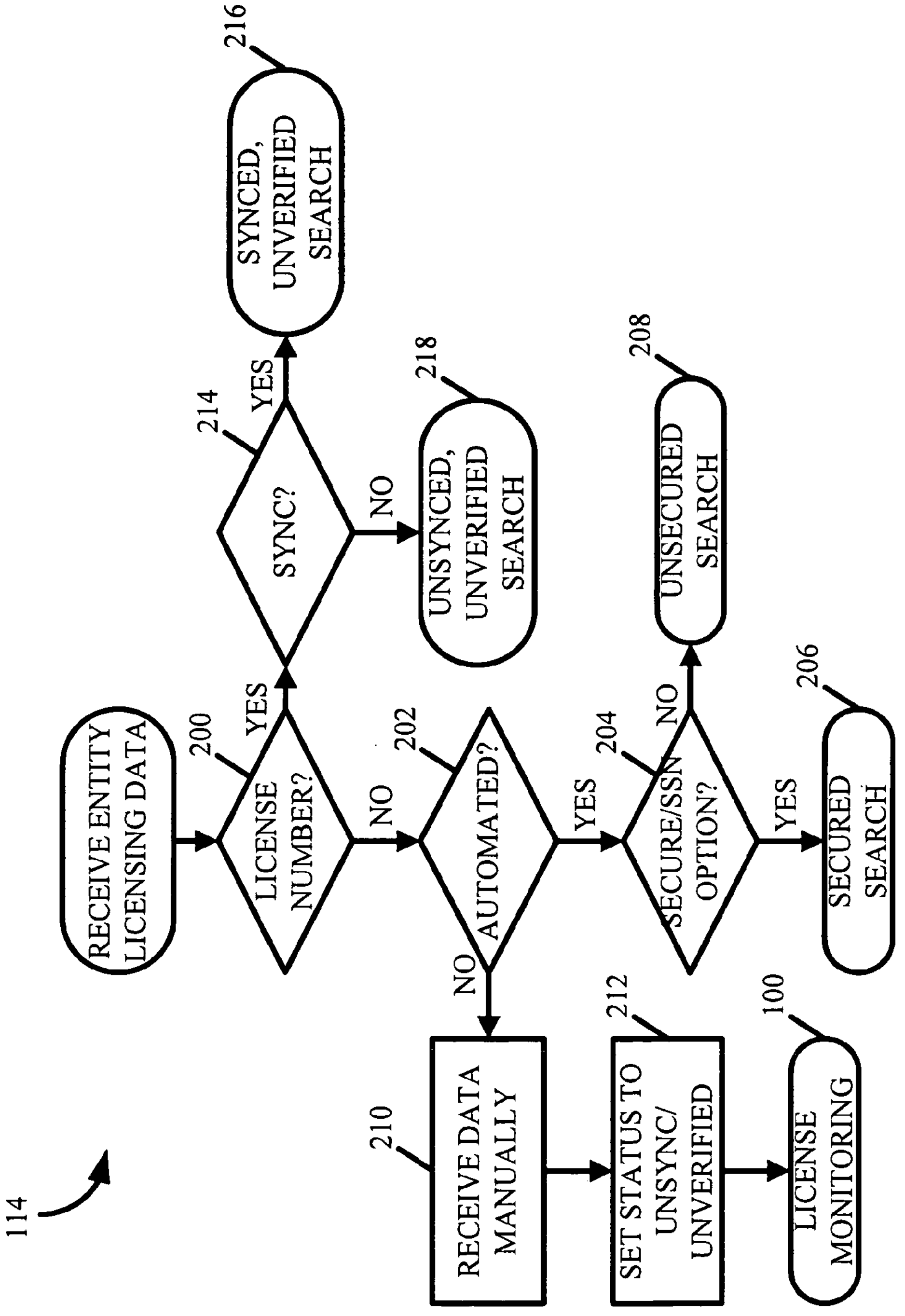
FIG. 3 is a flow chart of an example of a method of collecting licensing data relating to a license associated with a licensee from a regulatory entity.

FIG. 3 is an example of an entity licensing data collection routine 114 shown schematically in FIG. 2, and which may be used to collect entity licensing data. In particular, the routine 114 may be used to collect entity licensing data in a variety of circumstances. For example, the employee database 14 may include data related to known licenses associated with the licensee entity, including a license number or other manner of license identification. This data may provided to the license manager 12 when collecting the employment data during the license monitoring routine 100, or based on a previous execution of the entity licensing data collection routine 114. If a license number or other license identification is provided, the routine 114 may search for a license based on the license identification, as determined at block 200. Otherwise, the collection of entity licensing data proceeds on an alternative basis.

If a license identification is not known, the routine 114 proceeds to collect entity licensing data on an alternative basis. Some regulatory entities provide licensing data for an entity via the internet 28. As a result, such regulatory entities are considered automated entities whereby data may be automatically obtained via screen-scrapping and data mining techniques. For example, the routine 114 may access a website of the regulatory entity 18, 20 and enter search criteria to search for a license associated with the licensee entity (e.g., license type, license identification, licensee entity name, address, social security number, etc.). Of course, the search criteria may vary among the various regulatory entities 18, 20. The results from the search are provided on the website search results screen may be collected and returned back to the license manager 12. Alternatively, data may be obtained from automated regulatory entities 18, 20 via file transfer protocol (FTP), direct access to a regulatory entity database, or the like. The resulting files may include licensing data for some or all of the licensee entities maintained by the regulatory entity 18, 20. Although a few data collection techniques have been described herein, it should be recognized that a variety of techniques may be utilized to automatically obtain entity licensing data from the regulatory entities 18, 20.

If the regulatory entity 18, 20 is automated as determined at block 202, the routine 114 may continue to collected the entity licensing data on the basis of a secured or unsecured search; At block 204, if the connection between the license manager 12 and the regulatory entity 18, 20 is considered secure (e.g., secure sockets layer connection, etc.) and if a social security number may be used as the search criteria, the routine 114 may search for the entity licensing data at block 206 using the licensee entity's name and social security number. If the connection is not secure or if the social security number is not an available search criteria, the routine 114 may search for the entity licensing data at block 208 without using the licensee entity's social security number.

If the regulatory entity is not automated as determined at block 202, the routine 114 may collect the entity licensing data by having a user, such as the licensee entity or supervisor, manually enter the entity licensing to the license manager 12 at block 210. As previously mentioned, the license manager 12 may maintain entity licensing data, either from the employee database 14 or based on previous execution of the license monitoring routine 100. However, the entity licensing data maintained by the license manager 12 may be altered by a user, include errors and inconsistencies when entered manually, etc. As such, a verification status of the license may be maintained to determine whether the entity licensing data maintained by the license manager 12 has been synchronized and verified against the entity licensing data maintained by the regulatory entity. As used herein, "synchronized" generally refers to a verification status where the license has been confirmed or otherwise authenticated as belonging to the licensee entity. In other words, the licensee entity identification of the license maintained by the regulatory entity 18, 20 (e.g., name, social security number, date of birth, etc.) matches the licensee entity identification maintained by the license manager 12. Further, as used herein, "verified" generally refers to a verification status where the details of the license have been confirmed or otherwise authenticated as having been provided by the regulatory entity 18, 20. If the entity licensing data is modified, the verification status changes from "verified" to "unverified" because the entity licensing data maintained by the license manager 12 has not been authenticated against the entity licensing data maintained by the regulatory entity 18, 20.

Generally, the verification status of a license is only "verified" if the status is also "synchronized". Further, only entity licensing data from automated regulatory entities may be considered to be "synchronized" thereby avoiding mistakes resulting from data entered manually. As a result, the entity licensing data entered manually at block 210 results in a status of "unsynchronized, unverified" at block 212, and control is returned to the license monitoring routine 100. The monitoring routine 100 may continue to monitor a license on the assumption that the manually entered data is correct, though unsynchronized and unverified. However, upon a subsequent execution of the license monitoring routine 100, any manually entered entity licensing data may be synchronized and verified against the entity licensing data of the regulatory entity 18, 20, if available. Once the status is set to "synchronized", the entity licensing data may be automatically checked against the regulatory entity data on a periodic basis to capture any changes related to the license.

Referring back to block 200, if a license identification is known, the routine 114 may determine whether the status of the license is synchronized or un-unsynchronized at block 214. If synchronized, the routine 114 may continue to collect entity licensing data from the regulatory entity at block 216 by performing a search on the basis of a synchronized, unverified status, thereby collecting and/or attempting verify the entity licensing data. Otherwise, the routine 114 may collect entity licensing data from the regulatory entity at block 218 by performing a search on the basis of an un-synchronized, unverified status, thereby collecting and/or attempting synchronize and verify the entity licensing data.

Because each regulatory entity may maintain its own independent database and communication portal, such as an internet website or file transfer protocol site, the manner of accessing the entity licensing data may vary among the regulatory entities thereby causing the entity licensing data to be collected using various search criteria. For example, almost all state regulatory entities provide the licensee name as search criteria through an internet website. Some regulatory entities also allow a social security number, licensee address or portions thereof to be used as search criteria. For FTP sites, additional search criteria may include the full licensee address and date of birth. The search criteria may further be dependent on the security of the communication between the license manager 12 and the regulatory entity 18, 20. For example, secure communications may permit the use of a licensee entity's social security number as the search criteria which would not otherwise be used with an insecure communication due to concerns about unauthorized access. As such, a variety of search routines 206, 208, 216, 218 may be utilized by the license manager 12 to collect the entity licensing data as shown schematically in FIG. 3.

Although the entity licensing data may vary among the regulatory agencies, the entity licensing data received from the regulatory entity generally includes a variety of data fields including, but not limited to, license status (e.g., active, inactive, etc.), expiration date, licensee entity identification (e.g., social security number, name, address, etc.), license type (e.g., pharmacist license, pharmacy technician-license, pharmacy intern license, PTCB certification etc.), license identification (e.g., license number, etc.) and disciplinary action (e.g., an indication of disciplinary action, details of the disciplinary action, etc.). Using the entity licensing data collected from the regulatory entities 18, 20, the license manager 12 may determine whether the licensee entity has complied with the license requirements. For example, the license manager 12 may determine whether the licensee entity has a license as required by the regulatory entity, whether the license is active and valid, whether the license has any associated disciplinary action, and if so, whether the licensee entity is in compliance with the disciplinary action.

Figure 4:
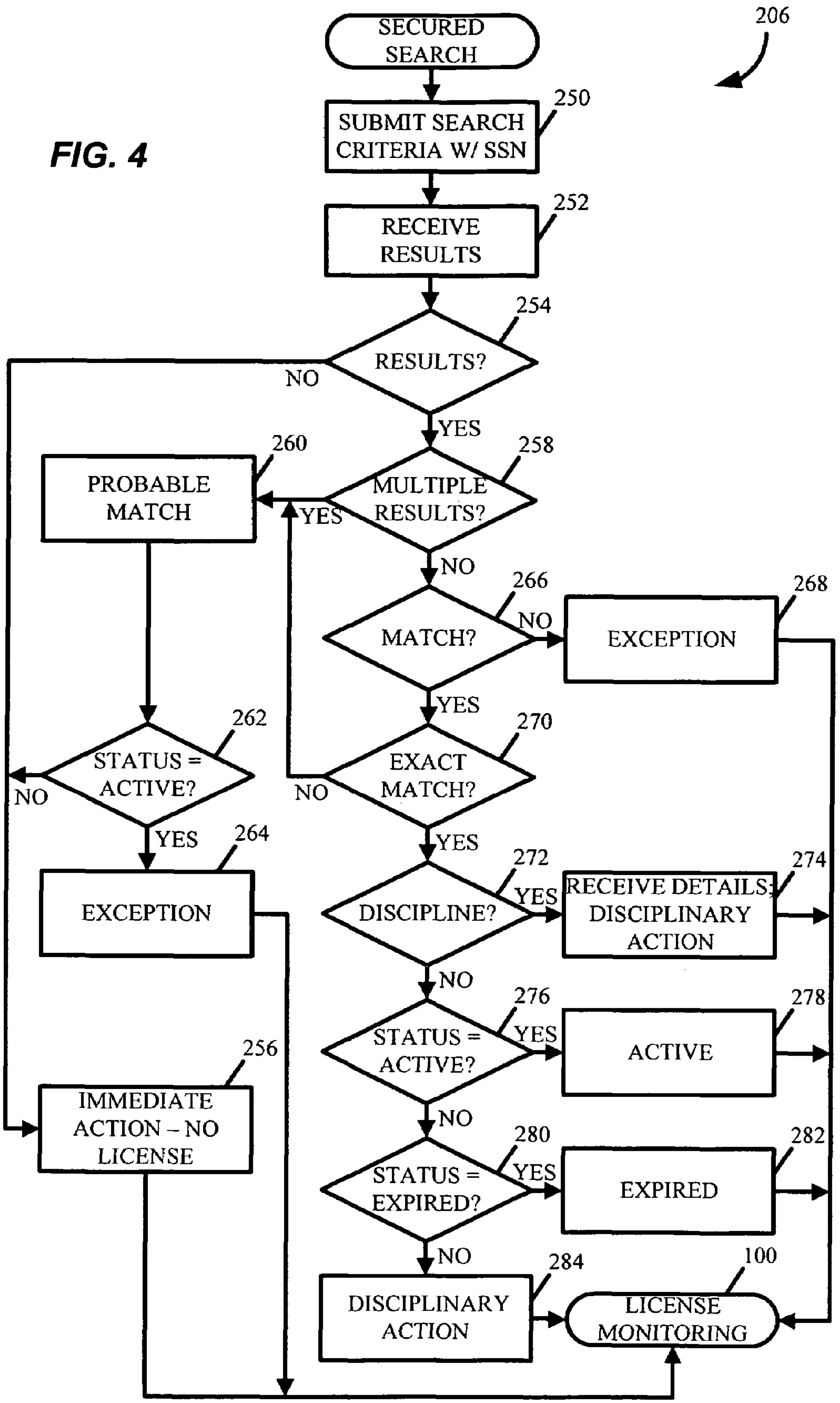
FIG. 4 is a flow chart of an example of a secured method of collecting licensing data from a regulatory entity.

FIG. 4 is an example of a secured search routine 206 shown schematically in FIG. 3, and which may be used to collect entity licensing data from an automated regulatory entity 18, 20 on the basis of a social security number and a licensee name. The secured search routine 206 may be used to obtain the entity licensing data from a regulatory entity 18, 20 having automated capabilities and where a secure communication connection is established between the regulatory entity and the license manager 12.

Beginning at block 250, the secured search routine 206 submits search criteria to the database of the regulatory entity 18, 20, where the search criteria includes a social security number and licensee name. The submission of the search criteria may depend on the communication portal, such as an internet website or file transfer protocol site. For a website, the secured search routine 206 may enter the search criteria on the website, whereas for a file transfer protocol site, the secured search routine 206 may search for the search criteria among the data file(s). Based on the search criteria, the license manager 12 receives results from the regulatory entity database 18, 20 at block 252. A result generally pertains to entity licensing data received from the regulatory entity, where the entity licensing data is related to a license associated with the licensee entity. In the event that no results are received based on the search criteria, as determined at block 254, the licensee entity, license type and regulatory agency are added to the "Immediate Action—No License" log 24 at block 256 to indicate that no entity licensing data, and hence no license, has been found relating to the licensee entity. A corresponding alert may be generated to indicate that the licensee entity is operating without a license, certificate, etc. as required by the entity license requirements.

If multiple results are received, as determined at block 258, the results are considered probable matches and stored in the "Probable Match" log 28 at block 260. The secured search routine 206 determines whether each of the resulting licenses are active licenses at block 262. Active licenses generally refer to licenses in good standing and which have not expired, whereas inactive licenses generally refer to revoked or expired licenses. If any license is not active the secured search routine 206 adds the licensee entity and license to the "Immediate Action—No License" log 24 at block 256 to indicate that the licensee entity may not have a valid license, and a corresponding alert may be generated. For those results that include valid licenses, the licensee entity and license is added to the "Exception" log 26 at block 264. An exception alert may be generated to indicate further resolution is required (i.e., which result pertains to the licensee entity), and the verification status may be set to "unsynchronized" and "unverified" because a license has not been conclusively confirmed as relating to the licensee entity. Control may then return to the license monitoring routine 100.

If a single result is received, as determined at block 258, the secured search routine 206 determines whether the result match one or more of the search criteria at block 266. To be considered a match, either the name and/or social security number match exactly. The secured search routine 206 may further compare additional criteria between the employment data and the entity licensing data to determine whether the result is a match, such as a date of birth of the licensee entity. If none of the search criteria or additional criteria matches the result, the license is added to the "Exception" log 26 at block 266, and a corresponding alert may be generated. If one or more of the search criteria and additional criteria match, or if the additional criteria is unavailable, the secured search routine 206 determines whether the result is an exact match at block 270. To be considered an exact match, the name, social security number and additional criteria, if any, match exactly. If any one search criteria or additional criteria does not match the result, the license is considered a probable match and stored in the "Probable Match" log 28 at block 260. If each of the search criteria and any additional criteria match exactly, the licensee entity and license is stored by the license manager 12 and associated with the licensee entity identification (e.g., employee identification, social security number, name, etc.) in the "Exact Match" log 30. Further, the verification status of the entity licensing data is set to "synchronized" and "verified" because the entity licensing data will have been authenticated as relating to the licensee entity and because the entity licensing data was directly provided by the regulatory entity.

At block 272, the secured search routine 206 determines whether the entity licensing data includes any record of disciplinary actions pertaining to the license. If so, the details of the disciplinary action, including, but not limited to, the period of discipline, type of discipline (e.g., censure, reprimand, etc.) and restrictions on practice are retrieved from the regulatory entity 18, 20 and the license is added to the "Disciplinary Action" log 38 at block 274. A corresponding alert regarding the disciplinary action may be generated.

If no disciplinary action is associated with the entity licensing data, the secured search routine 206 determines whether the license is active or not at block 276. If the license is active, the license is noted as active by adding the license to the "Active" log 34 at block 278. If the license is inactive, the secured search routine 206 determines whether the license is expired at block 280. A license is considered expired if the license expiration date provided with the entity licensing data is equal to or earlier than the date maintained by the license manager 12. If expired, the license is noted as expired by adding the license to the "Expired" log 32 at block 282 and a corresponding alert may be generated. If the license is not expired, the license is added to the "Disciplinary Action" log 38 at block 284 because generally licenses cannot be both active and expired.

Following any one of blocks 256, 264, 266, 274, 278, 282 or 282, the secured search routine 206 passes control back to the license monitoring routine 100 to retrieve or update entity licensing data for the next licensee entity or batch of licensee entities.

Figure 5:
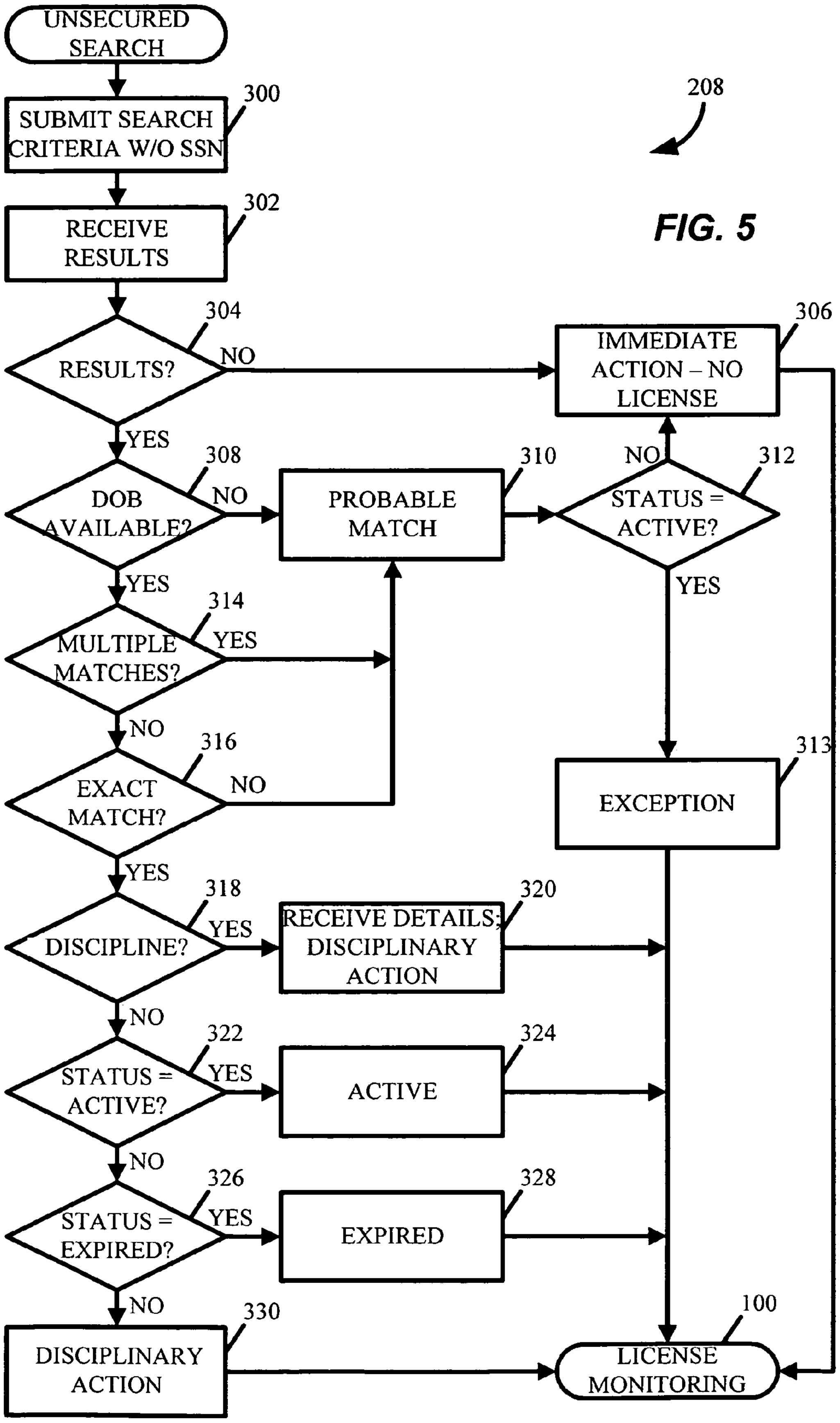
FIG. 5 is a flow chart of an example of a unsecured method of collecting licensing data from a regulatory entity.

FIG. 5 is an example of an unsecured search routine 208 shown schematically in FIG. 3, and which may be used to collect entity licensing data from an automated regulatory entity on the basis of the licensee entity's name or other identification other than a social security number. The unsecured search routine 208 may be used to obtain the entity licensing data from a regulatory entity 18, 20 having automated capabilities and where a social security number is not available or where a secure communication connection is not available between the regulatory entity and the license manager 12.

Beginning at block 300, the unsecured search routine 208 submits search criteria to the database of the regulatory entity 18, 20, where the search criteria includes a name or other form of identification to identify the licensee entity. The unsecured search routine 208 may enter the search criteria on a website or search for the search criteria among FTP data file(s). Based on the search criteria, the license manager 12 receives results from the regulatory entity 18, 20 at block 302. In the event that no results are received based on the search criteria, as determined at block 304, the licensee entity, license type and regulatory agency are added to the "Immediate Action—No License" log 24 at block 306 to indicate that no entity licensing data, and hence no license, has been found relating to the licensee entity. A corresponding alert may be then be generated to indicate that the licensee entity is operating without a license, certificate, etc. as required by the entity license requirements.

The entity licensing data received from the regulatory entity 18, 20 may include a date of birth, which, if available, may be compared to the licensee entity's date of birth for further verification. If one or more results are received, but the date of birth from the entity licensing data is unavailable as determined at block 308, the unsecured search routine 208 stores the entity licensing data in the "Probable Match" log 28 at block 310. At block 312, the unsecured search routine 208 determines whether the licenses are active or not. If a license is active, the license is included in the "Exception" log 26 at block 313 and an alert may be generated. If a license is inactive, the license is added to the "Immediate Action—No License" log 24 and a corresponding alert may be generated.

If multiple results are received based on the licensee entity's name and which match the date of birth and name, as determined at block 314, the results are considered probable matches and the entity licensing data is stored in the "Probable Match" log 28 at block 310. The status of the license is determined at block 312, and entity licensing data of active licenses is stored in the "Exception" log 26 at block 313 where an alert may be generated. Inactive licenses are added to the "Immediate Action—No License" log 24 and a corresponding alert may be generated. If a single result matches the date of birth, as determined at block 314, the unsecured search routine 208 determines whether the result is an exact match at block 316. If not, the result is considered a probable match. If the result is an exact match, the entity licensing data is stored by the license manager 12 and associated with the licensee entity identification (e.g., employee identification, social security number, name, etc.) in the "Exact Match" log 30. The verification status of the entity licensing data is set to "synchronized" and "verified" because the entity licensing data will have been authenticated as relating to the licensee entity and because the entity licensing data was directly provided by the regulatory entity.

At block 318, the unsecured search routine 208 determines whether the entity licensing data includes any record of disciplinary actions pertaining to the license and to the licensee entity. If so, the details of the disciplinary action, including, but not limited to the period of discipline, type of discipline (e.g., censure, reprimand, etc.), restrictions on practice, etc. are retrieved from the regulatory database 18, 20 and the license is added to the "Disciplinary Action" log 38 at block 320 and an alert may be generated.

If no disciplinary action is associated with the entity licensing data, the unsecured search routine 208 determines whether the license is active or not at block 322. If the license is active, the license is noted as active by adding the license to the "Active" log 34 at block 324. If the license is inactive, the unsecured search routine 208 determines whether the license is expired at block 326. If expired, the license is noted as expired by adding the license to the "Expired" log 32 at block 328 and a corresponding alert may be generated. If the license is not expired, the license is added to the "Disciplinary Action" log 38 at block 330 due to the inconsistency of being both active and expired. Following any one of blocks 312, 320, 324, 328 or 330, the unsecured search routine 208 passes control back to the license monitoring routine 100 to retrieve or update entity licensing data for the next licensee entity or batch of licensee entities.

Figure 6:
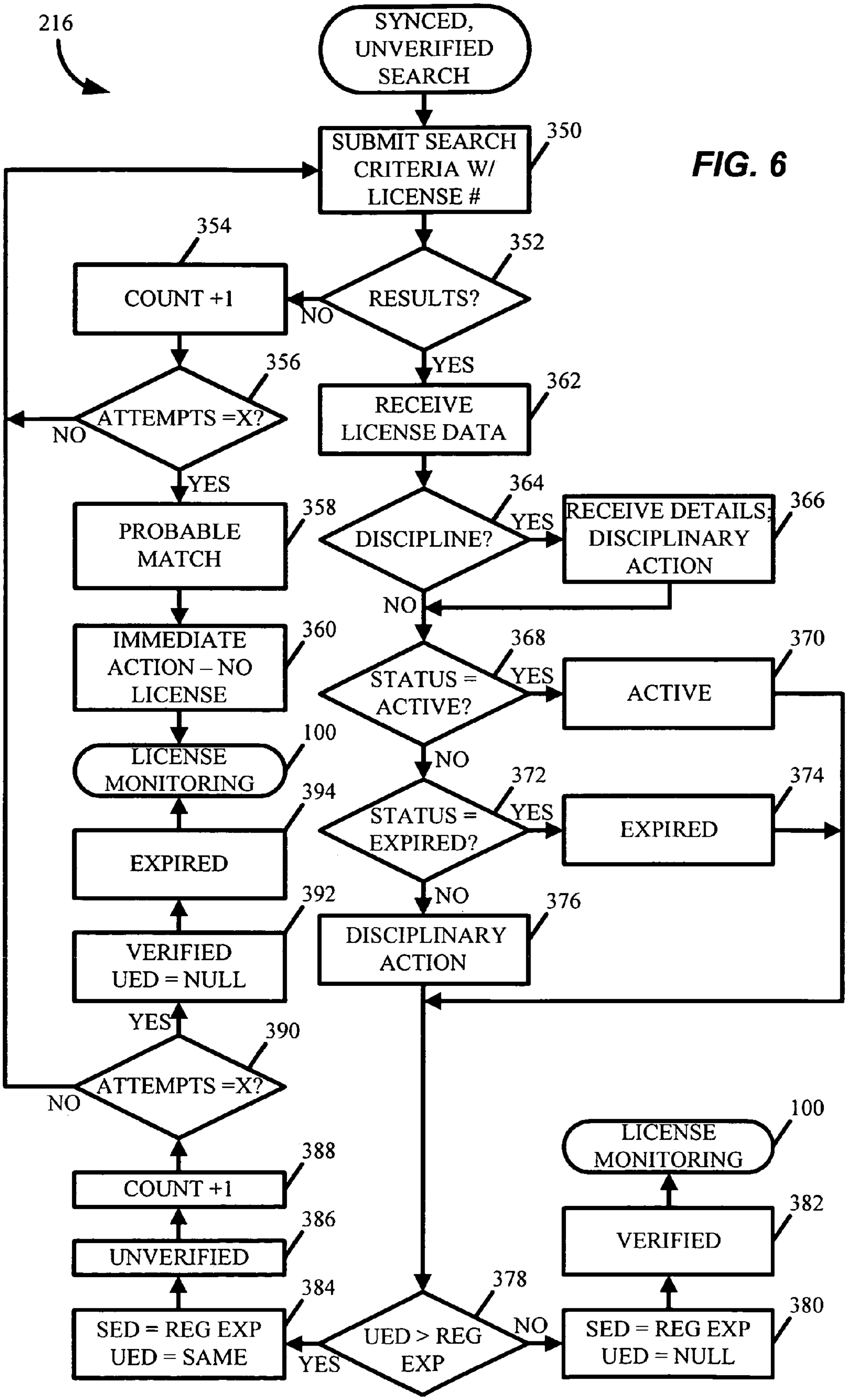
FIG. 6 is a flow chart of an example of a method of collecting licensing data from a regulatory entity using a known license identification, and the verification status of the licensing data is synchronized and unverified.

FIG. 6 is an example of a synchronized, unverified search routine 216 shown schematically in FIG. 3. The routine 216 may be used to collect entity licensing data from an automated regulatory entity when a license number and license type are known either from the employment data or from pre-existing entity licensing data maintained by the license manager 12. The verification status of a license with a known license number and license type is synchronized, but unverified. In other words, a license for the licensee entity is known and has been authenticated as belonging to the licensee entity, for example, from a previous search of the regulatory entity. However, the verification status is unverified because the entity licensing data has not been authenticated as having been provided by the regulatory entity. The unverified status may be the result of a manual input of the entity licensing data or due to an alteration of the entity licensing data maintained by the license manager 12 (e.g., a change in the expiration date by a user). As such, the routine 216 may be invoked periodically or whenever a change to the entity licensing data occurs to verify or re-verify the entity licensing data, and continually monitor the verification status and expiration of a license, in addition to collecting entity licensing data from a regulatory entity.

Beginning at block 350, the routine 216 submits search criteria to the database of the regulatory entity 18, 20, where the search criteria includes the license identification and license type. The license identification and license type may be entered through a website or searched among the FTP data file(s). Based on the search criteria, the license manager 12 receives results from the regulatory entity 18, 20. In the event that no results are received based on the search criteria, as determined at block 352, a counter maintained by the license manager 12 is incremented by one at block 354. If a predetermined number of attempts have been made to search for the entity licensing data based on the license identification and license type, as determined at block 356, the licensee entity and license type are considered a probable match and added to the "Probable Match" log 28 at block 358. Because no results were returned based on the license number, the license manager 12 may presume that no license exists, and adds the licensee entity and license type to the "Immediate Action—No License" log 24 at block 360 and a corresponding alert may be generated. However, if the predetermined number of attempts has not yet been reached, the routine 216 attempts to search for the entity licensing data again to prevent a premature alert being generated as a result of the addition to the "Immediate Action—No License" log 24.

If results are generated from the license identification and license type, the entity licensing data is received at block 362, including the status of the license, the expiration date of the license, associated disciplinary actions, etc. At block 364, the routine 216 determines whether the entity licensing data includes any record of disciplinary actions pertaining to the license and correspondingly pertaining to the licensee entity. If so, the details of the disciplinary action are retrieved from the regulatory database 18, 20 and the license is added to the "Disciplinary Action" log 38 at block 366 and a corresponding alert may be generated.

If no disciplinary action is associated with the entity licensing data, the routine 216 determines whether the license is active or not at block 368. If the license is active, the license is noted as active by adding the license to the "Active" log 34 at block 370. If the license is inactive, the routine 216 determines whether the license is expired at block 372. If expired, the license is noted as expired by adding the license to the "Expired" log 32 at block 374 and an alert may be generated. If the license is not expired, the license is added to the "Disciplinary Action" log 38 at block 376 due to the inconsistency of being both active and expired.

In addition to collecting/updating the entity licensing data using the license identification and license type, the routine 216 verifies the entity licensing data as corresponding to the data maintained by the regulatory entity. At block 378, the routine 216 considers the expiration data of the entity licensing data by comparing a user-entered expiration date (UED) is later than the expiration data provided by the regulatory entity 18, 20. If the user-entered expiration date is earlier than or equal to the expiration date from the entity licensing data, the expiration date maintained by the license manager 12 (SED) is updated at block 380 with the date provided with the entity licensing data provided from the regulator entity 18, 20. Further, the user-entered expiration date is set to "null". Because the entity licensing data has now been verified as being provided by the regulatory entity 18, 20, the routine 216 updated the verification status to "verified" at block 382.

If the user-entered expiration date is later than the expiration date from the entity licensing data, the expiration date maintained by the license manager 12 (SED) is updated at block 384 with the date provided with the entity licensing data provided from the regulatory entity 18, 20, and the user-entered expiration date remains the same. As a result, the verification status remains "unverified" at block 386. A counter may be maintained by the license manager 12 and incremented at block 388 to monitor the number of attempts at verifying the entity licensing data. If the number of attempts reach a predetermined value as determined at block 390, the routine 216 sets the user-entered expiration date to "null" and sets the verification status of the license to "verified" at block 392. If expired, the license may remain on the "Expired" log 32 at block 394.

Following any one of blocks 360, 382, 394 the routine 216 passes control back to the license monitoring routine 100 to retrieve or update entity licensing data for the next licensee entity or batch of licensee entities.

Figure 7:
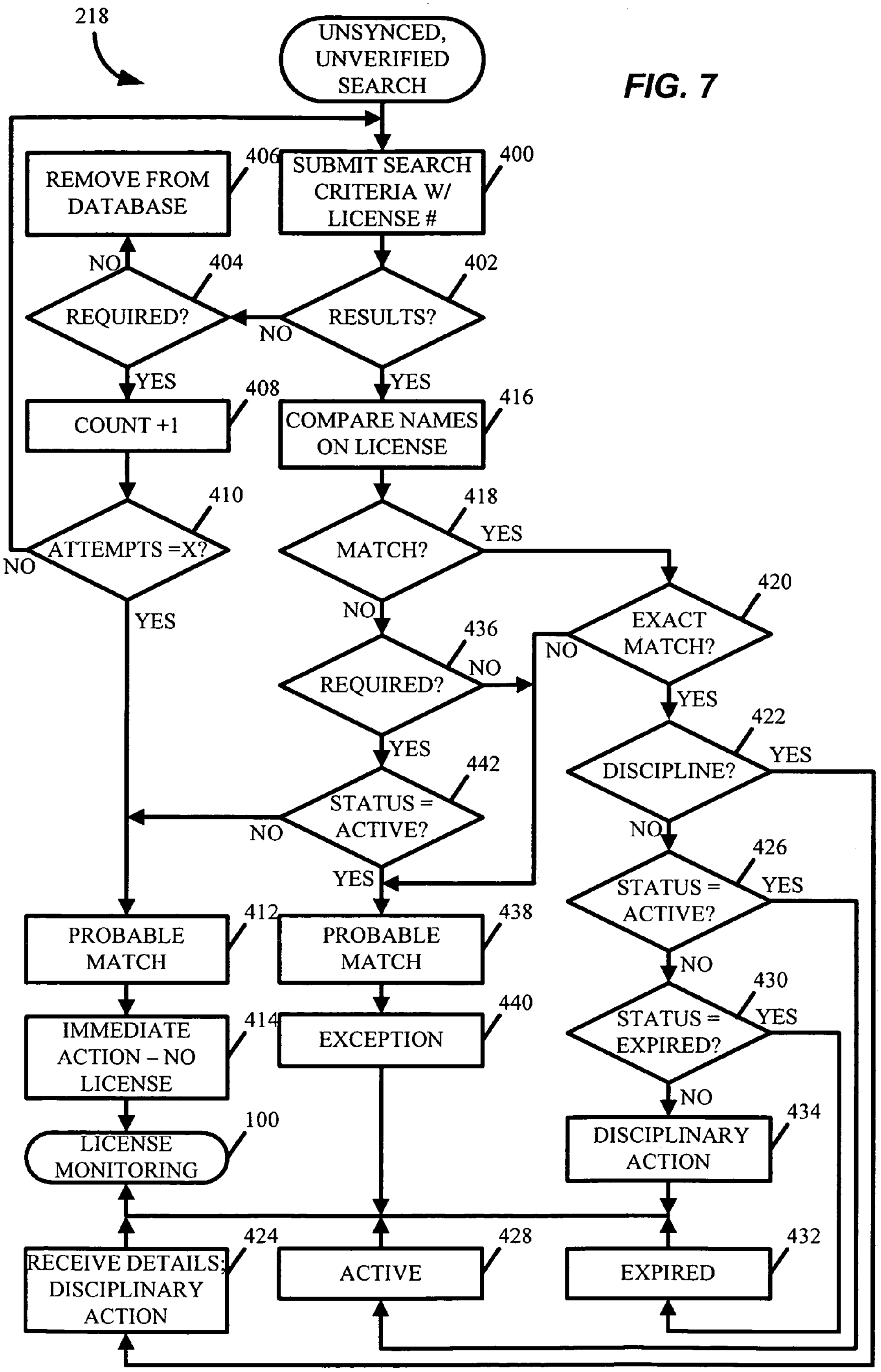
FIG. 7 is a flow chart of an example of a method of collecting licensing data from a regulatory entity using a known license identification, and the verification status of the licensing data is unsynchronized and unverified.

FIG. 7 is an example of an unsynchronized, unverified search routine 218 shown schematically in FIG. 3. The routine 218 may be used to collect entity licensing data from an automated regulatory entity when a license number and license type are known, but the verification status is both unsynchronized and unverified. In other words, a license for the licensee entity is known and has been neither authenticated as belonging to the licensee entity nor authenticated as having been provided by the regulatory entity 18, 20. The unsynchronized, unverified status may be the result of a manual input of the entity licensing data. As such, the routine 218 may be invoked periodically or whenever a change to the entity licensing data occurs to synchronize and verify (or re-synchronize and re-verify) the entity licensing data, and continually monitor the verification status and expiration of a license, in addition to collecting entity licensing data from a regulatory entity 18, 20.

Beginning at block 400, the routine 218 submits search criteria to the regulatory entity 18, 20, where the search criteria includes the license identification, license type and the name associated with the license identification. The search criteria may be entered through a website or searched among the FTP data file(s). Based on the search criteria, the license manager 12 receives results from the regulatory entity database 18, 20. In the event that no results are received based on the search criteria, as determined at block 402, the routine 218 determines whether a license is required at block 404. If the license is not required or is only required by a particular date, the license is removed from the license manager 12 at block 406 and added to the "No License required" log 36. If the license is required, a counter maintained by the license manager 12 is incremented at block 408. After a predetermined number of attempts have been made to search for the entity licensing data, as determined at block 410, the routine 218 maintains or stores the license in the "Probable Match" log 28 at block 412. Because no results were returned based on the license number, the license manager 12 may presume that no license exists, and the license is added to the "Immediate Action—No License" log 24 at block 414, and a corresponding alert may be generated. If the predetermined number of attempts has not yet been reached, the routine 218 attempts to search for the entity licensing data again to prevent a premature alert being generated as a result of the addition to the "Immediate Action—No License" log 24.

If results are generated from the license identification and license type, the entity licensing data is received and the name associated with the entity licensing data is compared with the name maintained by the license manager 12 at block 416. One or more portions of the names match as determined at block 418, the routine 218 determines if the name comparison is an exact match at block 420. If so, the entity licensing data is considered an exact match and stored in the "Exact Match" log 30. Otherwise, the entity licensing data is considered a probable match at block 438 and added to the "Probable Match" log 28. At block 422, the routine 218 determines whether the entity licensing data includes any record of disciplinary actions pertaining to the license and correspondingly pertaining to the licensee entity. If so, the details of the disciplinary action are retrieved from the regulatory database 18, 20 and the license is added to the "Disciplinary Action" log 38 at block 424, and an alert may be generated.

If no disciplinary action is associated with the entity licensing data, the routine 218 determines whether the license is active or not at block 426. If the license is active, the license is noted as active by adding the license to the "Active" log 34 at block 428. If the license is inactive, the routine 218 determines whether the license is expired at block 430. If expired, the license is noted as expired by adding the license to the "Expired" log 32 at block 432, and an alert may be generated. If the license is not expired, the license is added to the "Disciplinary Action" log 38 at block 434 due to the inconsistency of being both active and expired.

Referring back to block 418, if the names do not match exactly, the routine 218 determines whether the license is required at block 436. A license may not be required if it is not a license requirement of the regulatory entity, is marked as not required via the override function or not required until a future date. If the license is not required, the license is stored in the "Probable Match" log 28 at block 438. The licensee entity and license type is stored in the "Exception" log 26 at block 440 and an exception alert may be generated. If the license is required, the routine 218 determines whether the license is active at block 442. If so, the license is stored in the "Probable Match" log 28 at block 438, and the licensee entity and license type is stored in the "Exception" log 26 at block 440. Otherwise, the license is stored in the "Probable Match" log 28 at block 412 and the licensee entity and license type is stored in the "Immediate Action—No License" log 24 at block 414.

Following any one of blocks 424, 428, 432, 434 or 440 the routine 218 passes control back to the license monitoring routine 100 to retrieve or update entity licensing data for the next licensee entity or batch of licensee entities.

Figure 8:
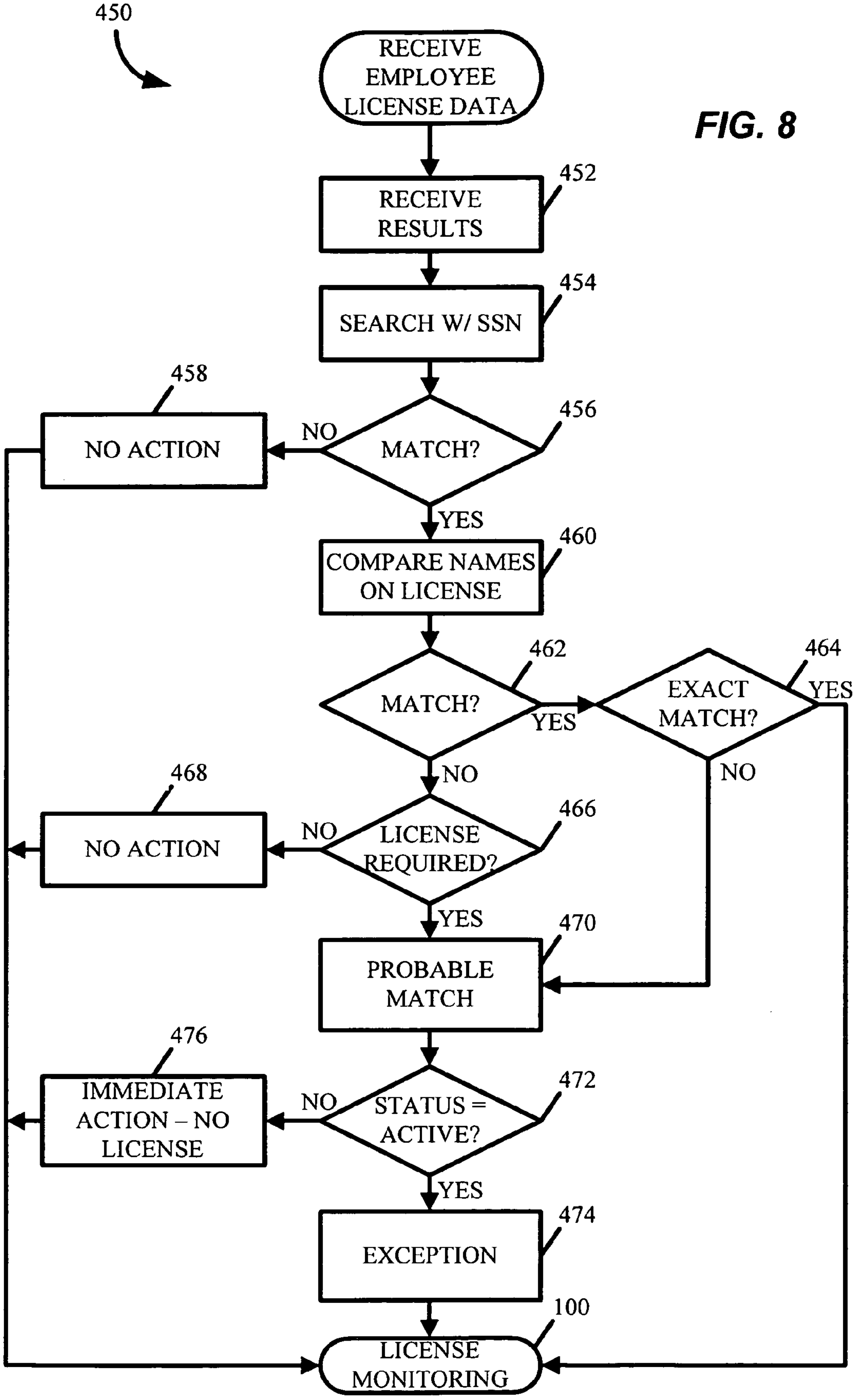
FIG. 8 is a flow chart of an alternative example of a method of collecting licensing data from a regulatory entity.

The above-described search routines 206, 208, 216, 218 used by the license manager 12 to collect entity licensing data and determine compliance with the entity license requirements generally include accessing a database of the regulatory entity 18, 20 either via a website or via an FTP site. An alternative example of collecting entity licensing data and determine compliance which may be utilized by the license manager 12 is depicted in FIG. 8. The routine 450 shown in FIG. 8 may be used to periodically receive data files from a regulatory entity 18, 20, such as through a file transfer protocol or other data transfer protocol. Each data file received by the license manager 12 using the routine 450 may relate to just one licensee entity identified by social security number, name, etc.

Beginning at block 452, the routine 450 may receive a data file from the regulatory entity 18, 20. Using a social security number of the licensee entity, or other manner of identification, the routine 450 searches for a corresponding identification in the data file at block 454. The routine 450 may only search for licensing data within the data file that is not already maintained by the license manager 12. At block 456, if the data file does not contain a matching social security number or other matching identification, no action is required as indicated at block 458.

If any search result matches the social security number or other identification of a licensee entity for which entity licensing data has not already been collected, the routine 450 compares the name of the licensee entity within the license manager 12 to the name within the data file at block 460. If all or part of the names match, as determined at block 462, the routine 450 determines if the names are an exact match at block 464. If so, the data file and associated entity licensing data is considered an exact match and is added to the "Exact Match" log 30. Otherwise, the entity licensing data is considered a probable match at block 470 and added to the "Probable Match" log 28.

If the names do not match at all, as determined at block 462, the routine 450 determines if a license is required at block 466. If a license is not required, either by the regulatory entity, via the override or not required until a future date, the licensee entity is added to the "No License required" log 36 and no action is required as indicated at block 468. However, if a license is required, the data file and associated entity licensing data is considered a probable match and is added to the "Probable Match" log 28 at block 470 and the verification status is set to unsynchronized and unverified.

At block 472, the routine 450 determines whether the status of the license is active and in good standing. If so, the license is included in the "Exception" log 26 at block 474. If the license is not active and in good standing, the license is added to the "Immediate Action—No License" log 24 at block 476. Following any one of blocks 458, 464, 468, 474 or 476.the routine 450 passes control back to the license monitoring routine 100 to retrieve or update entity licensing data for the next licensee entity or batch of licensee entities.

As mentioned above, changes to the data maintained by license manager 12, the employee database 14, or the regulatory entities 18, 20 may also cause the license monitoring routine 100 to be executed. For example, changes in the licensing requirements as maintained by the regulatory entities 18, 20 (e.g., newly effective license requirement) may cause the entity license requirements to change, such that a license is now required or no longer required. Such a change may result from a user adding or editing a licensing requirement as maintained in the license manager 12 for a particular workplace occupation (e.g., pharmacist, pharmacy technician, pharmacy intern, etc.). Alternatively, the license manager 12 may monitor or track impending changes in the license requirements, such as a change to a licensing requirement which becomes effective on a particular date. When a new license requirement is added, edited or becomes effective, the license manager 12 may execute the license monitoring routine 100 to receive updated regulatory license data and/or determine any new entity license requirements. To ensure the licensing requirement is accounted for in a timely fashion, a user may supply the license manager 12 with an effective date earlier than the actual effective date, and the license manager 12 may monitor licenses according to the user-entered effective date. According to the license monitoring routine 12 described above, if the updated license requirements result in a licensee entity requiring a license that was not previously required, or vice versa, the licensee entity and license may be added to or removed from the "Immediate Action—No License" log 24, "exception" log 26 and the "Probable Match" log 28 as appropriate.

In addition to changes in the license requirements, changes to the employment data may also initiate the execution of the license monitoring routine 100. For example, changes made to a licensee entity's employment data, such as a change in workplace occupation, a change in workplace location, a new hire or a change in employment status, may cause the entity license requirements to change, such that a license is now required or no longer required.

For newly hired licensee entities, the employment data is added to the employee database 14 and the license manager 12 determines the license requirements for the newly hired licensee entity based upon the workplace occupation and workplace location. If a license is required, as determined via the license monitoring routine 100, the license manager 12 will attempt to retrieve the associated entity licensing data. For changes to a licensee entity's workplace occupation or workplace location, the license manager 12 may determine the entity license requirements based on the new workplace occupation and/or workplace location. If a previously required license is no longer required, existing alerts for "Probable Match" and "Immediate Action—No License" may be cancelled, though alerts for "Expiration" and "Disciplinary Action" are maintained. If a license is now required, the license manager 12 marks the license as required, overrides any "not required" or "required by" designations and attempts to retrieve the associated entity licensing data. For changes to a licensee entity's employment status, all alerts may be cancelled if the licensee entity changes to inactive status. If the licensee entity changes to active status, the license manager 12 attempts to retrieve the entity licensing data if the entity licensing data is not already known or changes the verification status to "unverified" is the entity licensing data is already known.

As shown schematically in FIG. 1, a user interface routine 16 provides a graphical user interface (GUI) that is integrated with the license manager 12 described above to facilitate a user's interaction with the various license monitoring and verification capabilities provided by the license manager 12. However, before discussing the GUI in greater detail, it should be recognized that the GUI may include one or more software routines that are implemented using any suitable programming languages and techniques. Further, the software routines making up the GUI may be stored and processed within a single processing station or unit, such as a computer workstation, or, alternatively, the software routines of the GUI may be stored and executed in a distributed manner using a plurality of processing units that are communicatively coupled to each other within the business enterprise.

Preferably, but not necessarily, the GUI may be implemented using a familiar graphical windows-based structure and appearance, in which a plurality of interlinked graphical views or pages include one or more pull-down menus that enable a user to navigate through the pages in a desired manner to view and/or retrieve a particular type of information. The features and/or capabilities of the license manager 12 described above may be represented, accessed, invoked, etc. through one or more corresponding pages, views or displays of the GUI. Furthermore, the various displays making up the GUI may be interlinked in a logical manner to facilitate a user's quick and intuitive navigation through the displays to retrieve a particular type of information or to access and/or invoke a particular capability of the license manager 12.

Generally speaking, the GUI described herein provides intuitive graphical depictions or displays of licensee entities, licenses, employment data, entity licensing data, entity license requirements, regulatory licensing data, the logs 24-38 and associated alerts. The GUI may provide messages to the user in connection with an alert associated with the logs 24-38 indicating a problem that has occurred or which may be about to occur. These messages may include graphical and/or textual information that describes the problem, suggests possible changes to the system which may be implemented to alleviate a current problem or which may be implemented to avoid a potential problem, describes courses of action that may be pursued to correct or to avoid a problem, etc.

Figure 9:
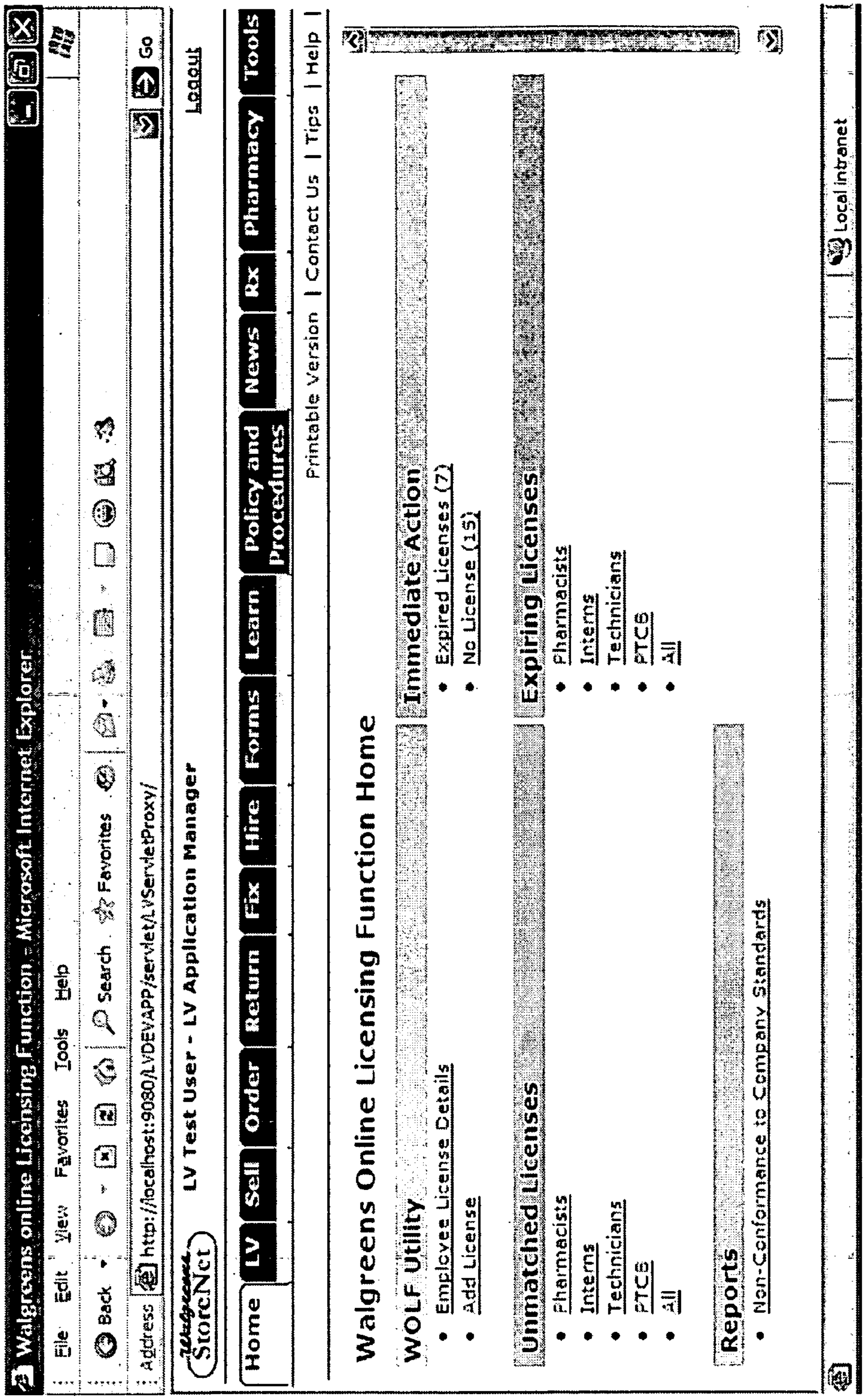
FIG. 9 is a an exemplary graphical display that may be provided by a graphical user interface.

FIG. 9 is an exemplary graphical display that may be provided by the GUI to enable a user to quickly analyze licensing information for licensee entities within a business enterprise or subsection thereof, such as a division, district, store, etc. As shown in FIG. 9, the GUI may graphically depict one or more of the various logs 24-38. In FIG. 9, the "Immediate Action—No License" log 24 is depicted as a link "No License (15)" where "15" indicates the number of licensee entities in this log, the "Expired" log 32 is depicted as a series of link of licenses about to expire ("Pharmacists", "Interns", "Technicians", "PTCB", "All") and as a link for licenses that have expired "Expired Licenses (7)" where "7" indicates the number of expired licenses, the "Active" log 34 is depicted as a link "Employee License Details", and the unmatched licenses, which may be provided in the "Immediate Action—No License" log 24 or the "Probable Match" log 28, is depicted as a series of links arranged according to licensee entity ("Pharmacists", "Interns", "Technicians", "PTCB", "All"). Additional GUI elements are provided to enable functions such as adding entity licensing data ("Add License"), or viewing a variety of reports (e.g., "Non-Conformance to Company Standards").

Figure 10:
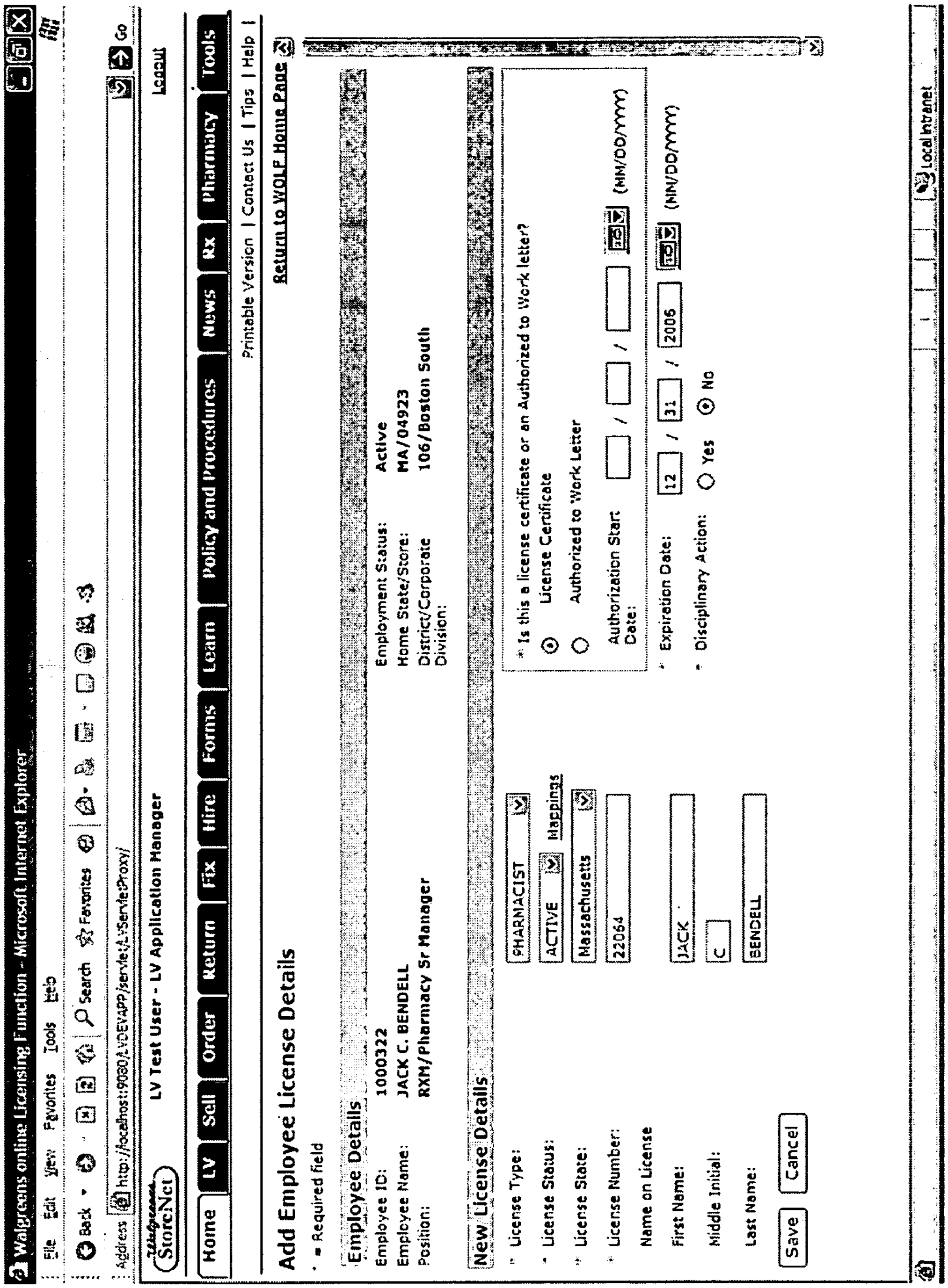
FIG. 10 is an exemplary depiction of a display that may be provided by a graphical user interface to enable a user to add entity licensing data.

FIG. 10 is an exemplary graphical display that may be provided by the GUI to enable a user to add entity licensing data and may be generated from selecting the "Add License" link. The license manager 12 may populate the GUI with employment data of the licensee entity from the employee database 14 including licensee entity identification (e.g., ID, name, etc.), workplace occupation and workplace location. A user may manually enter as much or as little entity licensing data as is known including the license type, license status, license identification (e.g., license number, name), regulatory entity, expiration date, etc.

Figure 11:
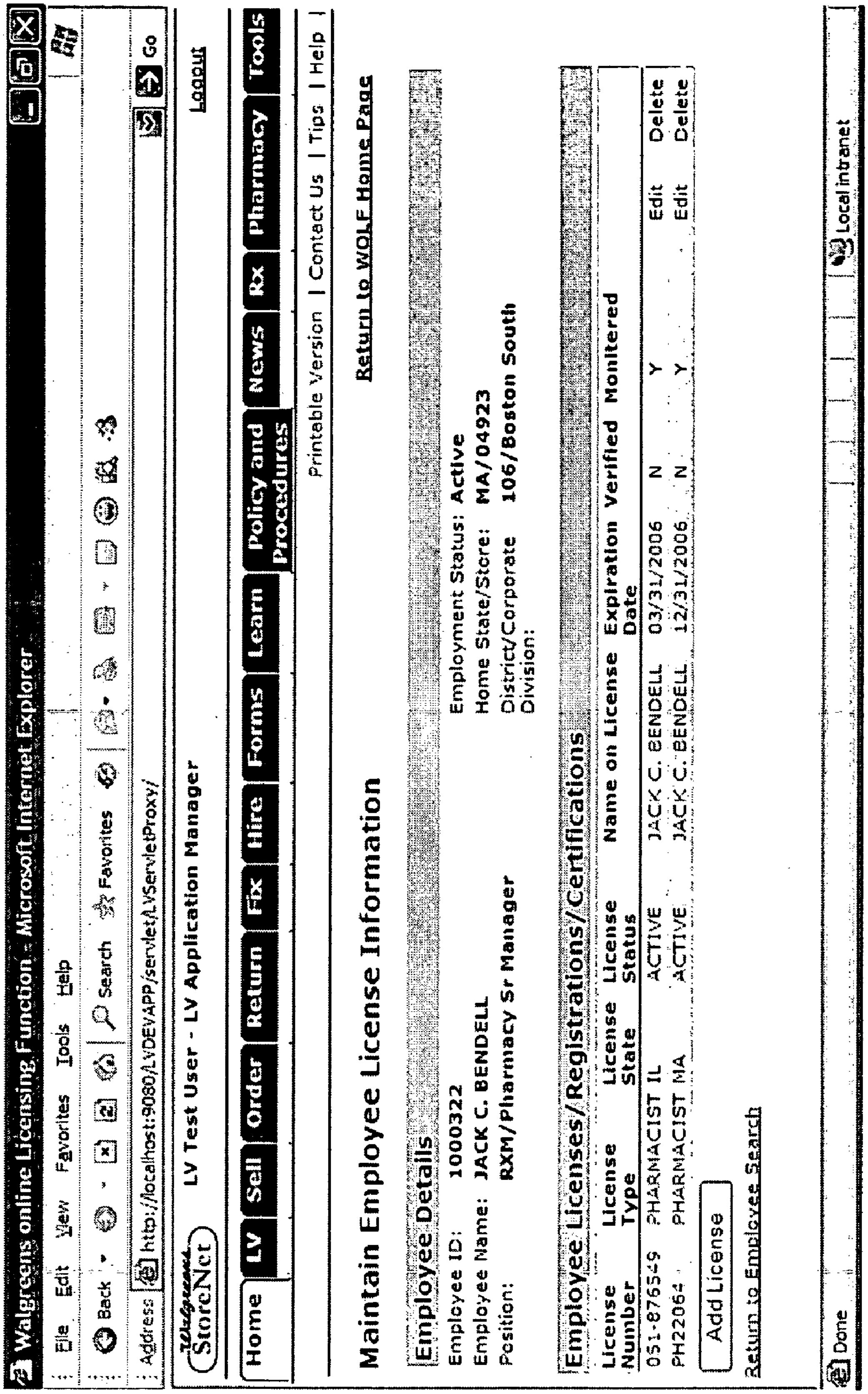
FIG. 11 is an exemplary graphical display that may be provided by a graphical user interface to enable a user to view entity licensing data.

FIG. 11 is an exemplary graphical display that may be provided by the GUI to enable a user to view entity licensing data and may be generated from selecting the "Employee License Details" link. The license manager 12 may populate the GUI with the employment data of the licensee entity from the employee database 14, and further populate the GUI with the entity licensing data associated with the licensee entity as provided via the license monitoring routine 100, including the license type, license status, license identification (e.g., license number, name), regulatory entity, expiration date, verification status, etc.

Figure 12:
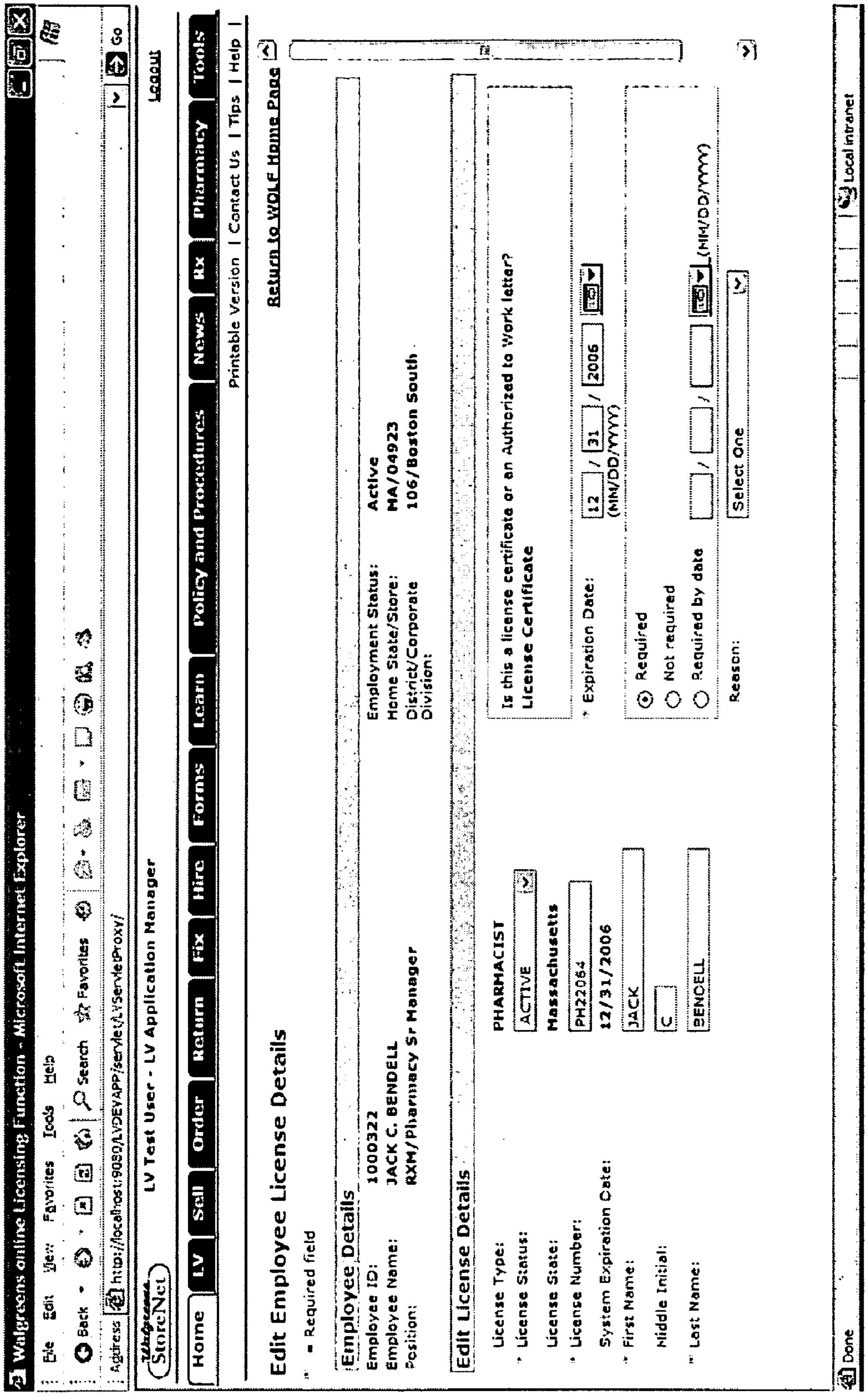
FIG. 12 is an exemplary graphical display that may be provided by a graphical user interface to enable a user to edit entity licensing data.

FIG. 12 is an exemplary graphical display that may be provided by the GUI to enable a user to edit entity licensing data. The editable fields may vary depending on the user, such that some fields may be edited whereas others cannot. Notably, a user override function is provided to indicate a license is not required or only required by a particular date.

Figure 13:
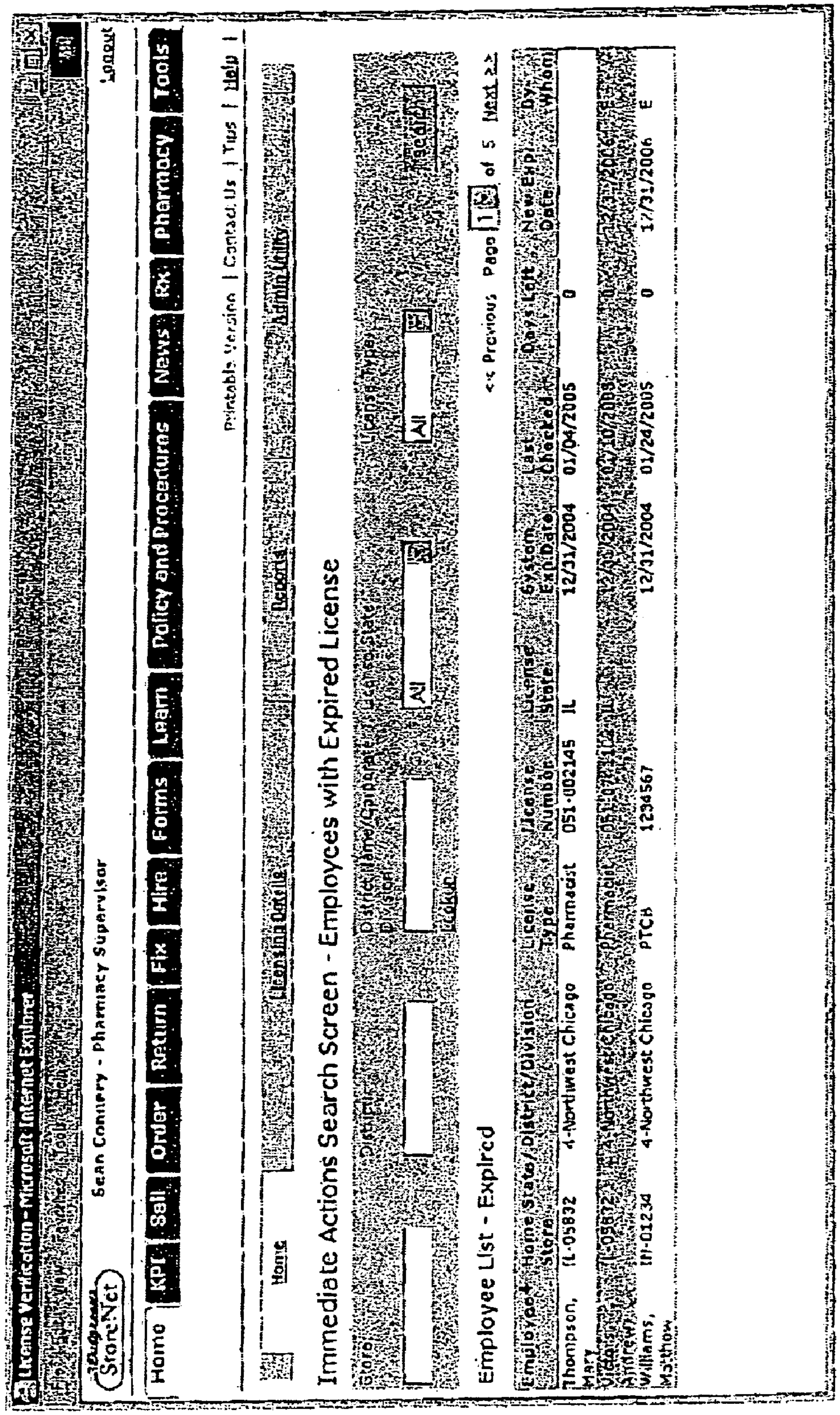
FIG. 13 is an exemplary graphical display that may be provided by a graphical user interface to enable a user to view alerts relating to an expired license.
Figure 14:
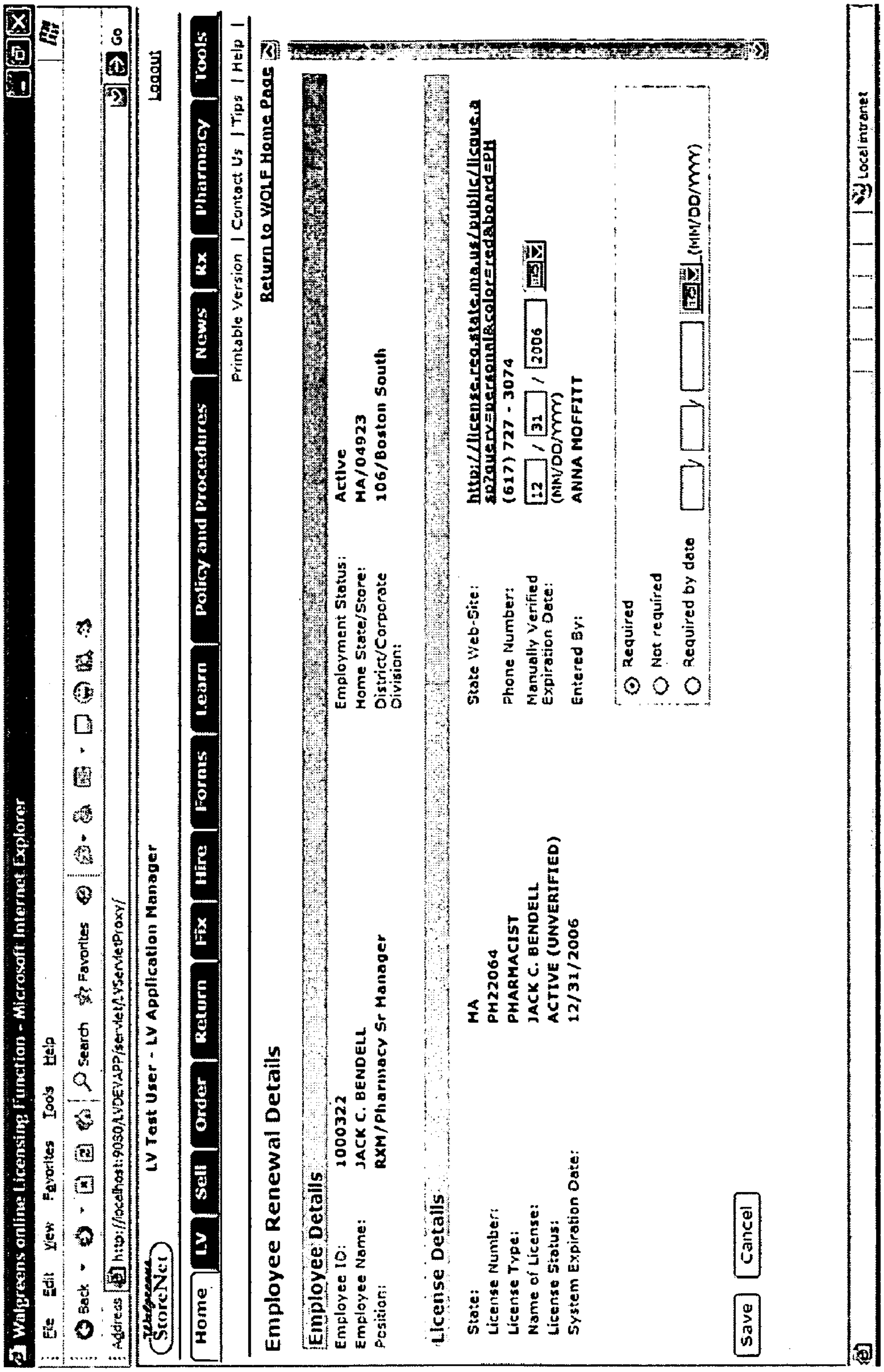
FIG. 14 is an exemplary graphical display that may be provided by a graphical user interface to enable a user to handle an alert from FIGS. 13 and 17.

FIG. 13 is an exemplary graphical display that may be provided by the GUI to enable a user to view alerts relating to an expired license and may be generated from selecting the "Expired Licenses (7)" link. The GUI allows the user to view expired licenses by various search criteria, including, but not limited to, store, district, division, state or type. Each expired license matching the search criteria is displayed accordingly to show the licensee entity and entity licensing data, as well as information about the expiration of the license such as when alerts were provided, the number of days left until expiration, etc. For expired or expiring licenses, the GUI may provide a graphical display to allow the user to renew the license or provide an override (not required, required by), as shown in FIG. 14.

Figure 15:
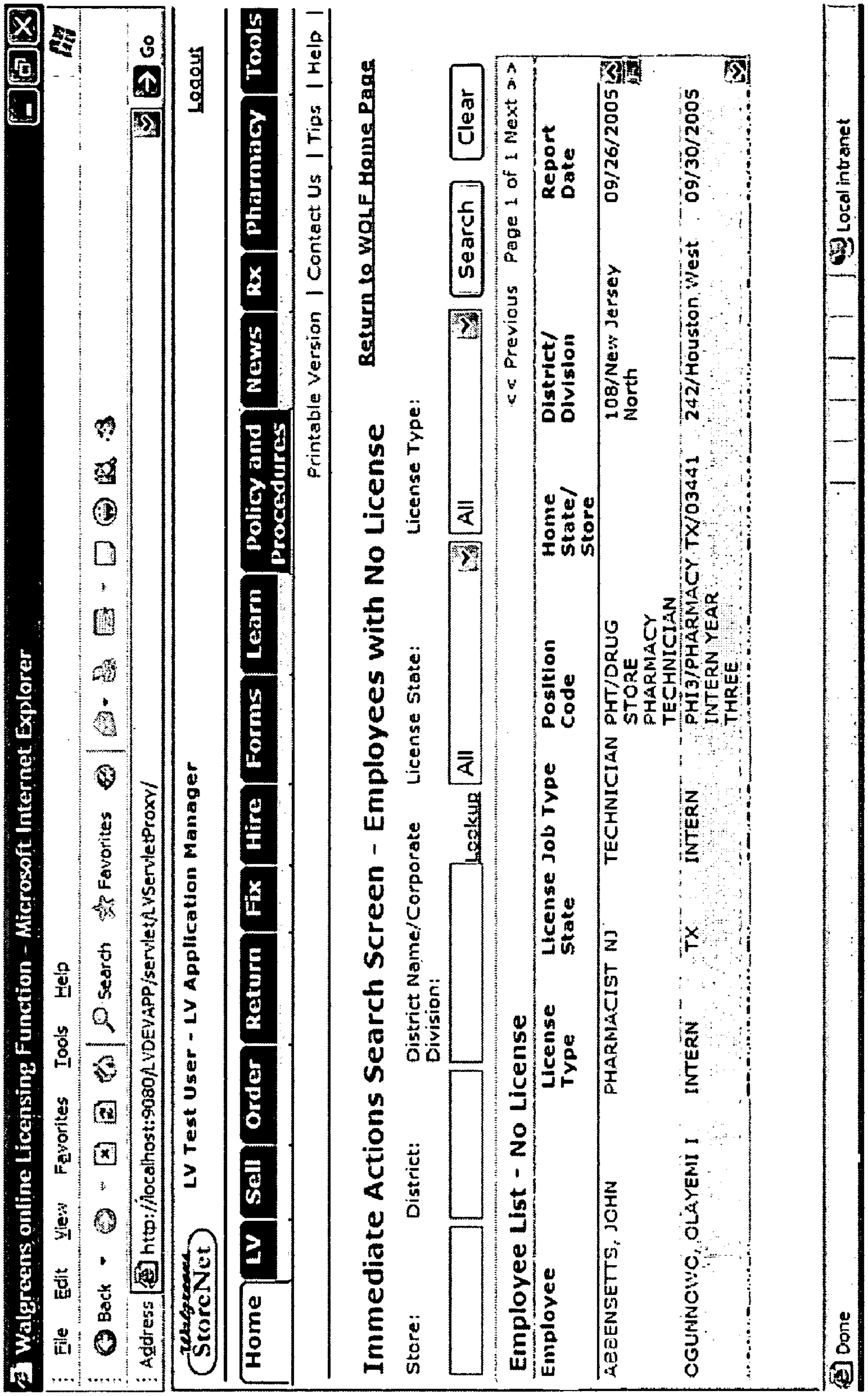
FIG. 15 is an exemplary graphical display that may be provided by a graphical user interface to enable a user to view alerts relating to a licensee entity without a required license.
Figure 16:
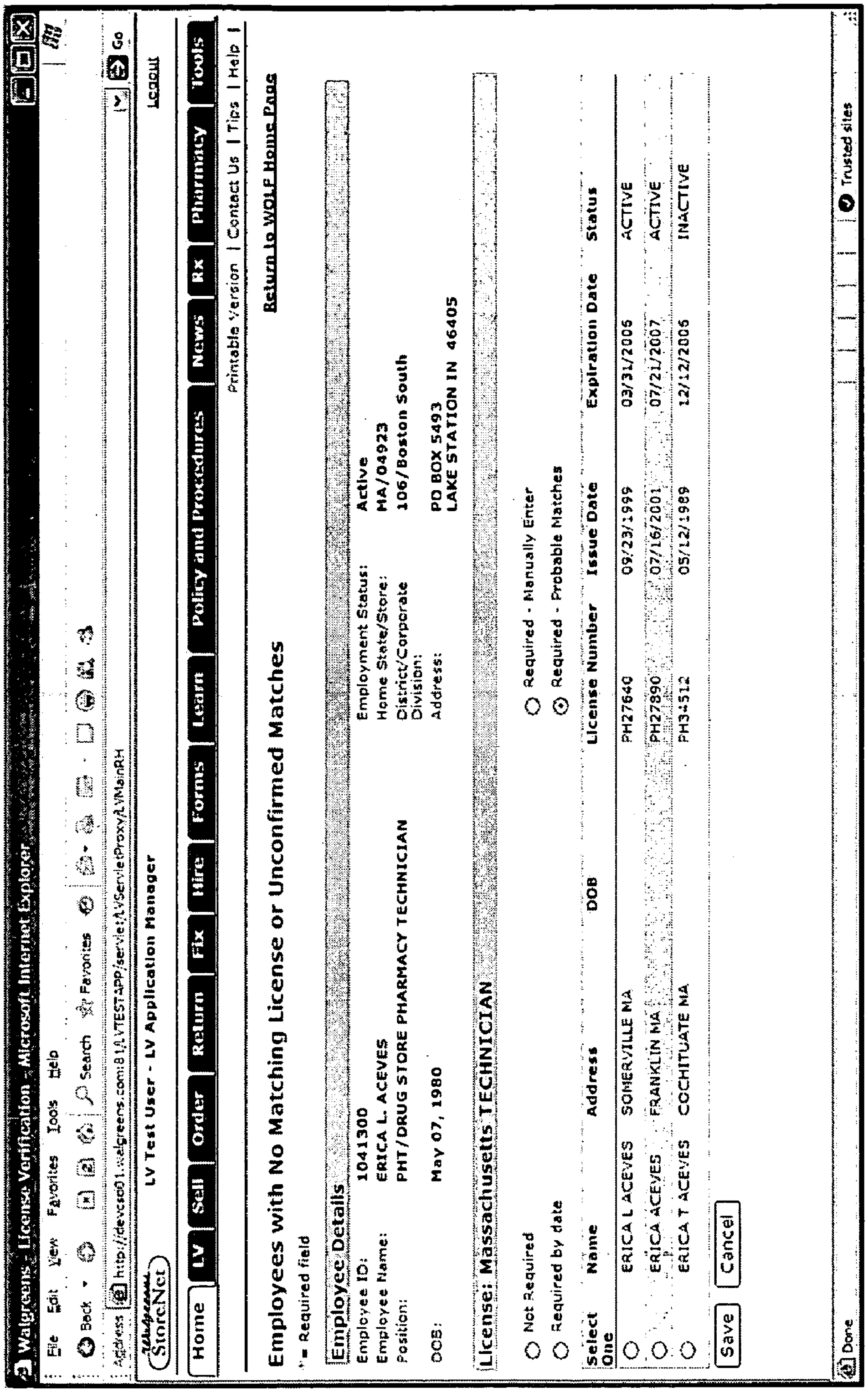
FIGS. 16 and 17 are exemplary graphical displays that may be provided by a graphical user interface to enable a user to handle an alert from FIGS. 15 and 21.
Figure 17:
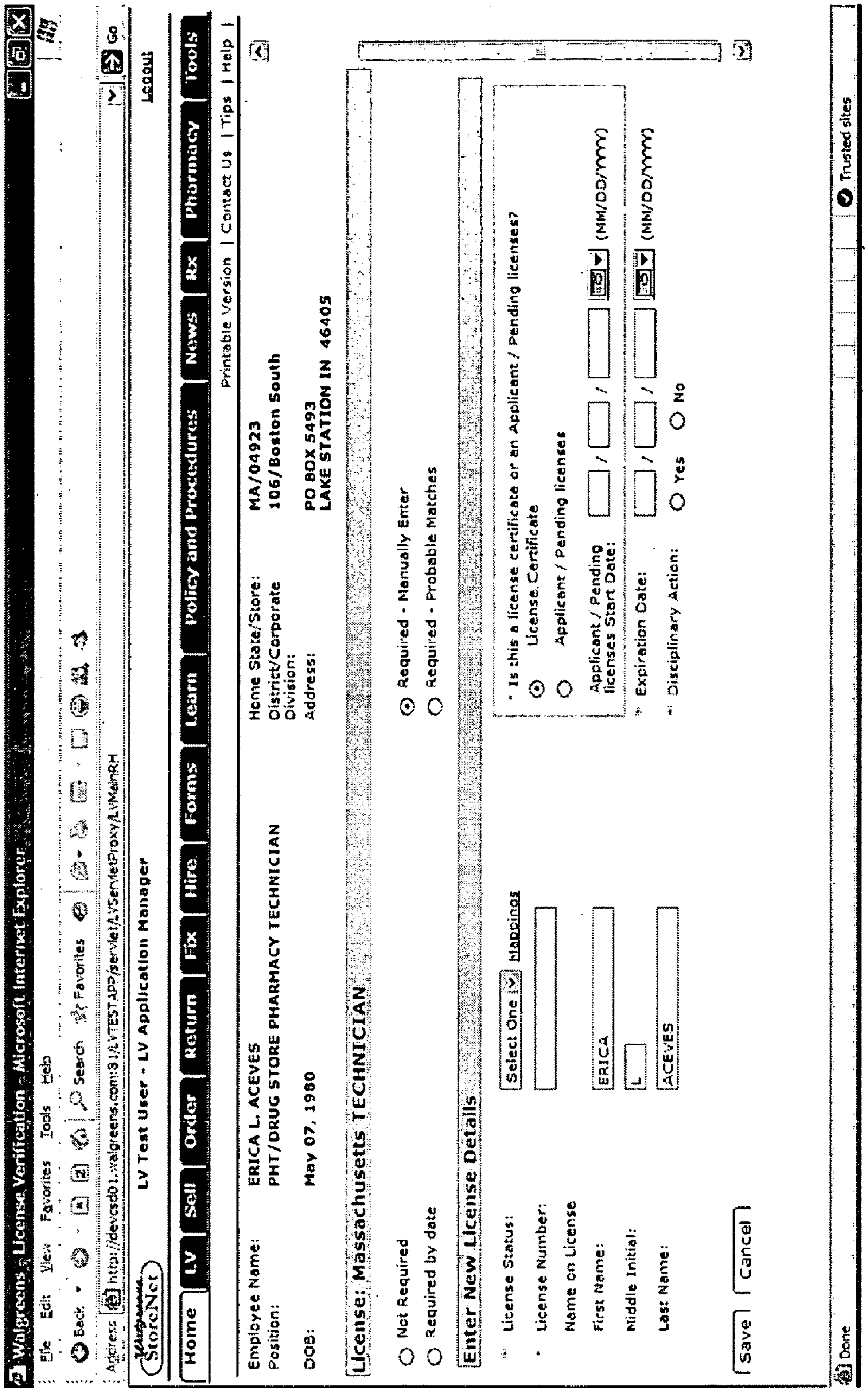

FIG. 15 is an exemplary graphical display that may be provided by the GUI to enable a user to view alerts relating to a licensee entity without a required license and may be generated from selecting the "No License (15)" link. The GUI allows the user to view those licensee entities without a license by various search criteria, including store, district, division, state or type. Each licensee entity without a required license matching the search criteria is displayed accordingly to show the licensee entity and corresponding employment data. For licensee entities without a required license, the GUI may provide a graphical display to allow the user to handle the alert, such as providing an override or canceling the alert, as shown in FIGS. 16 and 17. In FIG. 16, the GUI provides licensing information for the licensee entity without a required license, including the entity licensing data and all licenses associated with the licensee entity. The GUI may further provide a graphical display as shown in FIG. 17 to add entity licensing data.

Figure 18:
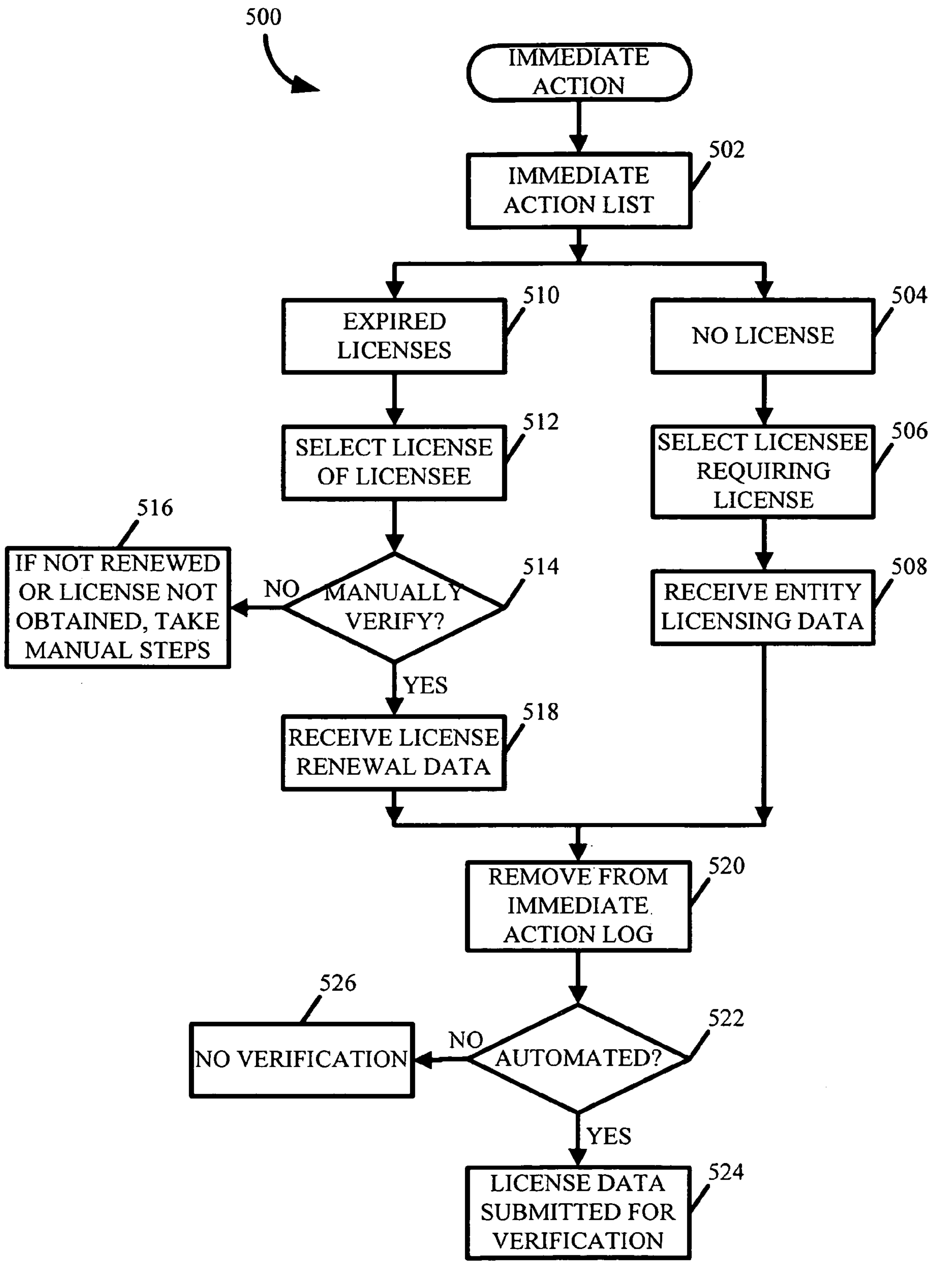
FIG. 18 is an example of a process for handling licenses requiring immediate action from FIGS. 13 and 15.

FIG. 18 is an example of a process 500 for handling licenses in the "Immediate Action" log 24 using the GUI. Beginning at block 502, a list from the "Immediate Action" log 24 may be generated for a user, such as a supervisor, is a graphical display, such as the graphical displays of FIGS. 13 and 15. If the immediate action list relates to licensee entities without licenses, the list may be displayed at block 504 using the graphical display from FIG. 15, for example. The user may select the licensee entity without a required license for handling from the list at block 506, and the entity licensing data may be provided at block 508 via the graphical displays of FIGS. 16 and 17, for example. From the data provided at block 508, the entity licensing data is considered a potential match. Alternatively, the user may indicate that the license is not required, or required by a future date.

If the immediate action relates to licensee entities with expired licenses the list may be displayed at block 510 using the graphical display from FIG. 13, for example. The user may select the expired license, or the licensee entity with an expired license, for renewal at block 512. At block 514, the user may indicate whether to manually verify the license renewal. If not, then at block 516 if the license is not renewed or the license is not obtained, then manual steps are taken to renew the license. If the license is manually verified as determined from block 514, the user enters the appropriate renewal details at block 518 using the graphical display from FIG. 14, for example.

Following blocks 508 and 518, the licensee entity and/or entity licensing data is removed from the "Immediate Action" log 24 at block 520. If the regulatory entity 18, 20 is automated, as determined at block 522, the entity licensing data is submitted for verification at block 524 against the data provided at block 508 and 518, examples of which have been provided above. If the regulatory entity 18, 20 is not automated, the license is considered unverified at block 526, and verification may not be required.

FIG. 19 is an exemplary graphical display that may be provided by the GUI to enable a user to view alerts relating to a license about to expire and may be generated from selecting the links associated with the "Expiring Licenses". The GUI allows the user to view expiring licenses by various search criteria, including store, district, division, state, type or immediacy of expiration. Each expiring license matching the search criteria is displayed accordingly to show the licensee entity and entity licensing data, as well as information about the expiration of the license such as when alerts were provided, the number of days left until expiration, etc. As disclosed above, the GUI may provide a graphical display for expiring licenses to allow the user to renew the license or provided an override (not required, required by), as shown in FIG. 14.

FIG. 20 is an example of a process 550 for handling expiring licenses using the GUI. Beginning at block 552, a user may search for one or more licensee entities from the list of expiring licenses generated on the graphical display of FIG. 19. If the license is about to expire within a configurable number of days as determined at block 554, the process 550 may limit any edits to the entity licensing data to particular users at block 556 or else display the expiring list at block 558. From the list, the user may select a license for editing at block 560. The entity licensing data of the selected license is edited for renewal at block 562 using the graphical display of FIG. 14, for example. If the regulatory entity for the license is automated, as determined at block 564, the entity licensing data as edited at block 566 is verified at block 514, as disclosed above. Otherwise, the verification status of the entity licensing data is set to "unverified" at block 568, and verification may not be required.

FIG. 21 is an exemplary graphical display that may be provided by the GUI to enable a user to view alerts relating to a license in the "Exception" log 26. The GUI allows the user to view exception licenses by various search criteria, including store, district, division, state, type or exception type. Each exception license matching the search criteria is displayed accordingly to show the licensee entity and entity licensing data. The GUI may provide a graphical display for exception licenses to allow the user to handle the exception (e.g., override, resolve multiple matches, manual entry, etc.), as shown in FIGS. 16 and 17.

FIG. 22 is an example of a process 600 for handling exception licenses using the GUI. Beginning at block 602, a user may search for unconfirmed licenses using the search criteria provided in the graphical display of FIG. 21. The search for unconfirmed licenses may include a search among potential licenses, manually entered licenses or licenses that have not otherwise been verified. At block 604, a user may select a license from the list of exception licenses generated from the search and displayed on the graphical display of FIG. 21, for example. At block 606, the GUI displays all potential matches, manually entered matches or other unverified matches. If the correct license is among the list or if a license is not required, as determined at block 608, the correct license is selected from the list or the user selects the override at block 610. The exception license is then removed from the "Exception" log 26 at block 612. On the other hand, the if correct license is not among the list or if the license is not required, the user may be prompted to add a new license at block 614 which may result in the generation of the graphical display of FIG. 10, for example. If the regulatory entity for the license is automated, as determined at block 616, the entity licensing data as entered at block 614 is verified at block 618, as disclosed above. Otherwise, the verification status of the entity licensing data is set to "unverified" at block 620.

While the license manager 12 and other elements have been described as preferably being implemented in software, they may be implemented in hardware, firmware, etc., and may be implemented by any other processor associated with the system 10. Thus, the elements described herein may be implemented in a standard multi-purpose CPU or on specifically designed hardware or firmware such as an application-specific integrated circuit (ASIC) or other hard-wired device as desired. When implemented in software, the software routine may be stored in any computer readable memory such as on a magnetic disk, a laser disk, or other storage medium, in a RAM or ROM of a computer or processor, in any database, etc. Likewise, this software may be delivered to a user or a process plant via any known or desired delivery method including, for example, on a computer readable disk or other transportable computer storage mechanism or over a communication channel such as a telephone line, the internet, wireless communication, etc. (which are viewed as being the same as or interchangeable with providing such software via a transportable storage medium).

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

The invention claimed is:

1. A system for monitoring a pharmacy license comprising: one or more user interfaces;

one or more data collection routines adapted to be executed by a processor which collect regulatory licensing data related to license requirements of a pharmacy regulatory entity, employment data related to workplace location and workplace position, and pharmacy licensing data related to the pharmacy license;

a store routine adapted to be executed by a processor which stores the regulatory licensing data, the employment data and the pharmacy licensing data;

a license requirements routine adapted to be executed by a processor which determines pharmacy license requirements for a pharmacy professional based on the regulatory licensing data and the employment data;

a license monitoring routine adapted to be executed by a processor which determines if a valid pharmacy license is associated with the pharmacy professional in accordance with the pharmacy license requirements.

2. The system of claim 1 wherein the one or more data collection routines are adapted to be executed by a processor to search one or more remote databases associated with a pharmacy regulatory entity to collect the regulatory licensing data and the pharmacy licensing data.

3. The system of claim 2 wherein the one or more data collection routines comprise at least one of the following: a file transfer protocol routine and a data mining routine.

4. The system of claim 1 further comprising a database adapted to store the employment data, wherein the one or more data collection routines are adapted to be executed by a processor to receive the employment data from the database.

5. The system of claim 1, wherein the license monitoring routine is adapted to be executed by a processor to determine if a pharmacy license associated with the pharmacy professional is required.

6. The system of claim 1, wherein the license monitoring routine is adapted to be executed by a processor to generate an alert if a valid license is not associated with the pharmacy professional in accordance with the pharmacy license requirements.

7. The system of claim 1, wherein the pharmacy licensing data comprises data related to the status of the pharmacy license, and wherein the license monitoring routine is adapted to generate an alert if the license is not active.

8. The system of claim 1, wherein the license monitoring routine is adapted to be executed by a processor to determine if disciplinary action is associated with the pharmacy professional.

9. The system of claim 1, further comprising a synchronization routine adapted to be executed by a processor which authenticates whether the pharmacy license is associated with the pharmacy professional.

10. The system of claim 9, wherein the synchronization routine is adapted to:

search for a license record based on an identification associated with the pharmacy license to produce pharmacy licensing data related to a pharmacy license;

compare an identification associated with the pharmacy professional with an identification provided by the pharmacy licensing data; and associate the pharmacy license with the pharmacy professional if the identification associated with the pharmacy professional matches the identification provided by the pharmacy licensing data.

11. The system of claim 1, further comprising a verification routine adapted to be executed by a processor which determines if the pharmacy licensing data was collected from one or more remote databases associated with a pharmacy regulatory entity.

12. The system of claim 11, wherein the verification routine is adapted to:

search for a license record based on an identification associated with the pharmacy license from the one or more remote databases associated with a pharmacy regulatory entity to produce pharmacy licensing data related to a pharmacy license; and compare the produced pharmacy licensing data to the stored pharmacy licensing data.

* * * * *